United States Patent
Nagasaki

(10) Patent No.: US 10,803,510 B2
(45) Date of Patent: Oct. 13, 2020

(54) INFORMATION PROCESSING APPARATUS FOR AUTOMATIC ORDER OF CONSUMABLE ITEMS

(71) Applicant: Brother Kogyo Kabushiki Kaisha, Nagoya-shi, Aichi-ken (JP)

(72) Inventor: Takeshi Nagasaki, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 850 days.

(21) Appl. No.: 15/085,471

(22) Filed: Mar. 30, 2016

(65) Prior Publication Data
US 2016/0292772 A1 Oct. 6, 2016

(30) Foreign Application Priority Data

Mar. 31, 2015 (JP) ................................. 2015-073530
Feb. 3, 2016 (JP) ................................. 2016-018663

(51) Int. Cl.
G06Q 30/06 (2012.01)
G06Q 10/08 (2012.01)
(Continued)

(52) U.S. Cl.
CPC ..... G06Q 30/0633 (2013.01); G06K 15/4075 (2013.01); G06Q 10/083 (2013.01);
(Continued)

(58) Field of Classification Search
CPC ............. G06K 15/102; G06K 15/4075; G06Q 10/083; G06Q 10/087;
(Continued)

(56) References Cited

U.S. PATENT DOCUMENTS 6,204,763 B1 * 3/2001 Sone ..................... A47G 29/141
                                                                      221/2
6,567,718 B1 * 5/2003 Campbell .......... G05B 19/4184
                                                                      451/10
(Continued)

FOREIGN PATENT DOCUMENTS

JP    2003-015477 A    1/2003
JP    2006-313226 A    11/2006
(Continued)

OTHER PUBLICATIONS

Farhad Manjoo, How your printer tricks you into buying ink and toner when you don't need it, Slate.com, Aug. 21, 2008. pp. 1-5. (Year: 2008).*

(Continued)

Primary Examiner — Adam L Levine
(74) Attorney, Agent, or Firm — Banner & Witcoff, Ltd.

(57) ABSTRACT

An information processing apparatus includes a communication interface, a storage, and a controller. The controller is configured to acquire consumable item information including remaining amount information about a remaining amount of a consumable item, determine whether an order condition for ordering a new consumable item is met on the basis of the remaining amount information, determine whether the consumable item has been used in rapid pace on the basis of the remaining amount information, receive a user instruction whether an order of the new consumable item is placed when determining that the consumable item currently in use has been used in rapid pace, and transmit order information including information about the order of the new consumable item to a server when determining that the order condition is met or in response to receipt of the user instruction to place the order of the new consumable item.

19 Claims, 12 Drawing Sheets

(51) Int. Cl.
*G06K 15/00* (2006.01)
*H04L 29/08* (2006.01)
*H04N 1/00* (2006.01)
*G06K 15/10* (2006.01)

(52) U.S. Cl.
CPC ........... *G06Q 10/087* (2013.01); *H04L 67/02* (2013.01); *H04N 1/00244* (2013.01); *H04N 1/00832* (2013.01); *G06K 15/102* (2013.01); *H04N 2201/0094* (2013.01)

(58) Field of Classification Search
CPC .......... G06Q 30/06–0645; G06Q 30/08; H04L 67/02; H04N 1/00244; H04N 1/00832; H04N 2201/0094
See application file for complete search history.

(56) References Cited

U.S. PATENT DOCUMENTS

| | | | | |
|---|---|---|---|---|
| 6,999,190 | B2* | 2/2006 | Shimbori | G06Q 30/02 358/1.15 |
| 7,340,501 | B2* | 3/2008 | Miida | G06F 11/3013 707/999.001 |
| 8,271,348 | B2* | 9/2012 | Rise | G06Q 30/0601 705/26.35 |
| 8,275,271 | B2* | 9/2012 | Satonaga | G03G 15/5079 399/24 |
| 10,438,276 | B2* | 10/2019 | Godsey | G06Q 10/087 |
| 2009/0086269 | A1 | 4/2009 | Nakajima | |
| 2014/0006117 | A1* | 1/2014 | Kritt | G06Q 30/0241 705/14.4 |
| 2015/0019386 | A1 | 1/2015 | Kimura | |
| 2015/0088702 | A1* | 3/2015 | Amigud | G06Q 30/0635 705/28 |

FOREIGN PATENT DOCUMENTS

| | | |
|---|---|---|
| JP | 2009-086805 A | 4/2009 |
| JP | 2013-109202 A | 6/2013 |
| JP | 2013-190567 A | 9/2013 |

OTHER PUBLICATIONS

Jul. 23, 2019—(JP) Office Action—App 2016-018663.

\* cited by examiner (PROCESSES BY MANAGEMENT SERVER)

| UNIQUE INFORMATION | TYPE INFORMATION | REMAINING AMOUNT | NUMBER OF REPLACEMENTS | PRINT COUNT | MANUAL ORDER COMPLETION INFORMATION |
|---|---|---|---|---|---|
| 102a1 | 102a2 | 102a3 | 102a4 | 102a5 | 102a6 |
| XX | CYAN-212 | 80% | 3 | 300 | NOT MANUALLY ORDERED |
|  | MAGENTA-212 | 50% | 2 | 500 | NOT MANUALLY ORDERED |
|  | YELLOW-100 | 30% | 3 | 700 | NOT MANUALLY ORDERED |
|  | BLACK-100 | 40% | 4 | 900 | MANUALLY ORDERED |
| ... | ... | ... | ... | ... | ... |
| YY | CYAN-212 | 90% | 1 | 75 | NOT MANUALLY ORDERED |
|  | MAGENTA-212 | 80% | 1 | 100 | NOT MANUALLY ORDERED |
|  | YELLOW-212 | 80% | 1 | 100 | NOT MANUALLY ORDERED |
|  | BLACK-212 | 70% | 1 | 150 | NOT MANUALLY ORDERED |

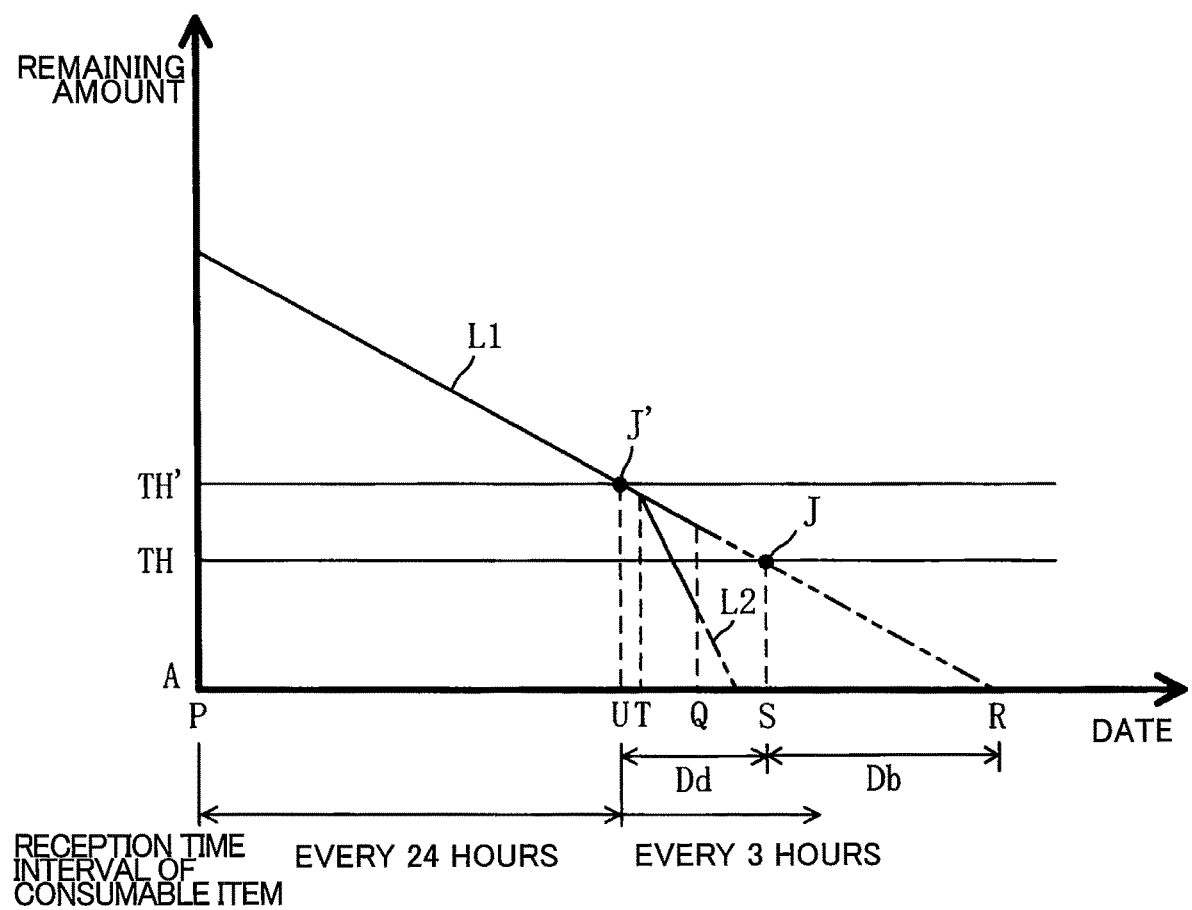

INFORMATION PROCESSING APPARATUS FOR AUTOMATIC ORDER OF CONSUMABLE ITEMS

CROSS REFERENCE TO RELATED APPLICATION

This application claims priorities from Japanese Patent Application Nos. 2015-073530 filed Mar. 31, 2015 and 2016-018663 filed Feb. 3, 2016. The entire contents of the priority applications are incorporated herein by reference.

TECHNICAL FIELD

The present disclosure relates to an information processing apparatus.

BACKGROUND

Japanese Patent Application Publication No. 2013-109202 discloses an image forming device that transmits a toner cartridge delivery request to a consumable item management system when a remaining amount of toner is less than a delivery threshold value. In the technique disclosed in Japanese Patent Application Publication No. 2013-109202, the delivery threshold value is determined using statistical data for predicting future toner consumption obtained on the basis of measured data of a consumed amount of a toner and the number of days necessary for delivery until a toner cartridge is delivered after the delivery request is transmitted.

SUMMARY

However, there are cases in which a change in the consumed amount of the toner greatly changes according to a user's circumstances. This point is not considered in Japanese Patent Application Publication No. 2013-109202. When the consumed amount of the toner increases in rapid pace (that is, the toner is used in rapid pace) during a certain period of time, the rapid-pace increase is not sufficiently reflected in the statistical data, a transmission timing of the delivery request is delayed, and the delivery of the toner cartridge is unlikely to be made in time.

In view of the foregoing, it is an object of the present disclosure to provide an information processing apparatus capable of delivering a consumable item at an appropriate timing even when the consumable item is used in rapid pace during a certain period of time.

In order to attain the above and other objects, the disclosure provides an information processing apparatus including: a communication interface configured to communicate with a server; a storage; and a controller. The controller is configured to: acquire consumable item information including remaining amount information about a remaining amount of a consumable item currently in use; determine whether or not an order condition for ordering a new consumable item is met on the basis of the remaining amount information; determine whether or not the consumable item currently in use has been used in rapid pace on the basis of the remaining amount information; in response to determining that the consumable item currently in use has been used in rapid pace, receive a user instruction whether or not an order of the new consumable item is placed; and in response to determining that the order condition is met or in response to receipt of the user instruction to place the order of the new consumable item, transmit order information including information about the order of the new consumable item to the server.

According to another aspects, the disclosure provides an information processing apparatus including a storage and a controller. The controller is configured to: acquire consumable item information including remaining amount information about a remaining amount of a consumable item currently in use; determine whether or not an order condition for ordering a new consumable item is met on the basis of the remaining amount information; determine whether or not the consumable item currently in use has been used in rapid pace on the basis of the remaining amount information; in response to determining that the consumable item currently in use has been used in rapid pace, receive a user instruction whether or not an order of the new consumable item is placed; and in response to determining that the order condition is met or in response to receipt of the user instruction to place the order of the new consumable item, determine to order the new consumable item.

BRIEF DESCRIPTION OF THE DRAWINGS

The particular features and advantages of the disclosure as well as other objects will become apparent from the following description taken in connection with the accompanying drawings, in which:

FIG. 6 is a schematic diagram illustrating an example of a table stored in a storage of the management server according to the first embodiment;

FIG. 7 is a graphical representation for describing the change of reception time interval performed by a controller of a management server according to a modified example of the first embodiment;

DETAILED DESCRIPTION

Figure 1:
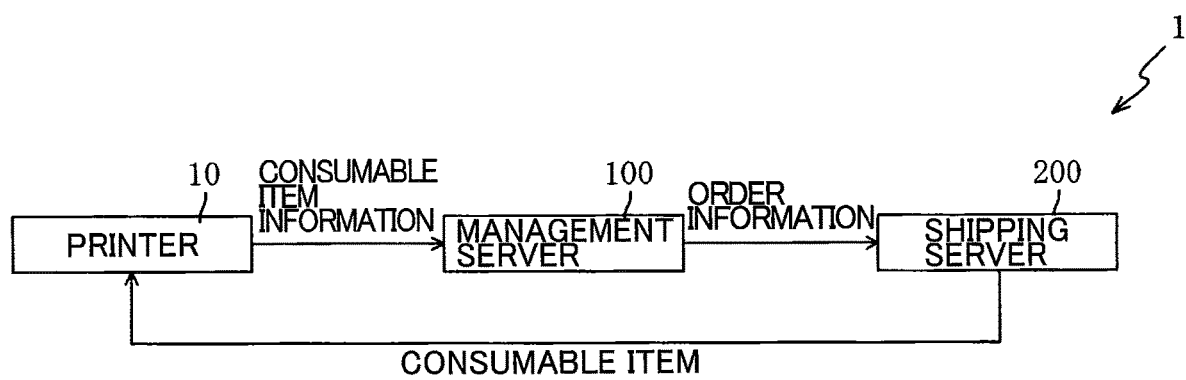
FIG. 1 is a block diagram illustrating an overall configuration of a consumable item ordering system.

An information processing apparatus according to embodiments will be described while referring to the accompanying drawings wherein like parts and components are designated by the same reference numerals to avoid duplicating description. It would be apparent to those skilled in the art that various changes and modifications may be made therein without departing from the scope of the disclosure. Further, any components and processes described in following embodiments can arbitrary combined.

First Embodiment

First, a first embodiment will be described while referring to FIGS. 1 to 8. FIG. 1 is a block diagram illustrating an overall configuration of a consumable item ordering system 1. The consumable item ordering system 1 includes a management server 100, a printer 10, and a shipping server 200. As will be described in detail later, the management server 100 of the first embodiment can deliver the consumable item to the user of the printer 10 at an appropriate timing before the consumable item becomes unusable even when the consumable item of the printer 10 is used in rapid pace (that is, the consumed amount in the consumable item of the printer 10 is increased in rapid pace). The management server 100 is an example of claimed "information processing apparatus." The shipping server 200 is an example of claimed "server."

In the consumable item ordering system 1, The printer 10 transmits unique information identifying the printer 10 and consumable item information to the management server 100 at each predetermined timing (for example, at a fixed time every day). In the first embodiment, the management server 100 transmits a consumable item information notification request at each predetermined timing. The printer 10 transmits the consumable item information to the management server 100 in response to receipt of the consumable item information notification request. The printer 10 may be configured to periodically transmit the consumable item information to the management server 100 without using the consumable item information notification request from management server 100.

The unique information is a unique character string such as a MAC address of the printer 10, a node name of the printer 10 registered in advance, a model number of the printer 10, or the serial number allocated to an individual printer 10. In the present embodiment, the unique information of the printer 10 is the model number of the printer 10. The claimed "unique information" may be the serial number or both of the model number and the serial number of the printer 10. The claimed "unique information" further may be the MAC address of the printer 10 or the node name of the printer 10 registered in advance.

The consumable item information includes information (hereinafter, referred to as "remaining amount information") about the remaining amount of the consumable item in use in the printer 10. The consumable item is, for example, an ink cartridge. The printer 10 includes a sensor that detects the remaining amount of the consumable item. Each time the consumable item information is transmitted, the printer 10 detects the remaining amount of the consumable item and transmits the consumable item information including the remaining amount information indicating the detected remaining amount to the management server 100. The remaining amount represented by the remaining amount information may be a percentage of the remaining amount indicated by "%" or a physical amount indicated by "ml" or "g."

When the consumable item is the ink cartridge, a plurality of ink cartridges are mounted to the printer 10 for usable colors. The consumable item information includes information (hereinafter, referred to as "type information") about a type of the consumable item. That is, the consumable item information includes, for each type of the consumable item, the type information and remaining amount information about the consumable item of the type indicated by the type information. In the present embodiment, the type of the consumable item indicated by the type information is the model number of the consumable item. For example, a color or a capacity of the consumable item can be specified by the model number of the consumable item. The type of the consumable item indicated by the type information may be a color or a capacity of the consumable item.

The management server 100 analyzes the consumable item information received from the printer 10. When the remaining amount of the consumable item reaches a threshold value (that is, when the remaining amount of the consumable item is smaller than the threshold value), the management sever 100 determines to order the consumable item and transmits order information to the shipping server 200. The consumable item information is analyzed for each type indicated by the type information included in the consumable item information. The order information includes: the type information corresponding to the type of the consumable item whose remaining amount has reaches (fallen below) the threshold value; the unique information of the printer 10 that is the transmission source of the consumable item information for the consumable item that is the order target; and an order request.

As will be described in detail later, the management server 100 determines whether or not the consumable item has been used in rapid pace on the basis of the analysis of the consumable item information received from the printer 10. When the management server 100 determines that the consumable item has been used in rapid pace although the remaining amount of the consumable item has not yet reached the threshold value (i.e., "an automatic order threshold value" to be described later), the management server 100 displays on the printer 10 a selection screen. In the selection screen, whether or not an order of a new consumable item is needed can be inputted (selected) in order to replace the rapid-pace used consumable item with the new consumable item. Then, when selection to order the new consumable item is inputted on the selection screen, the management server 100 determines to order the consumable item and transmits the order information to the shipping server 200, similarly to a case when the remaining amount of the consumable item has reached the automatic order threshold value.

The shipping server 200 stores a shipping information table including the unique information of the printer 10 registered by each user, the model number of the consumable item that is the type of the consumable item, and information (hereinafter, simply referred to as "delivery destination information") about a delivery destination of the consumable item for a plurality of printers 10. The shipping information table has contents for each user, that include the unique information, the model number, and the delivery destination information associated with one another. The delivery destination information is, for example, an address of a delivery destination. Each information stored in the shipping information table is registered in advance by the user. In the shipping information table, for each color of the consumable item, the color may be associated with the model number of the consumable item as the type of the consumable item.

When the shipping server 200 receives the order information from the management server 100, the shipping server 200 specifies the model number of the consumable item and the delivery destination information corresponding to the unique information included in the received order information with reference to the shipping information table. The shipping server performs a process for delivering the consumable item of the specified model number to the delivery destination indicated by the specified delivery destination information. As a result of the process, the consumable item of the model number corresponding to the order information transmitted to the shipping server 200 on the basis of the consumable item information received by the management server 100 from the printer 10 is delivered to the delivery destination corresponding to the order information, that is, the consumable item of the model number corresponding to the order information is delivered to the user having the printer 10 that is the target of the order information.

Figure 2:
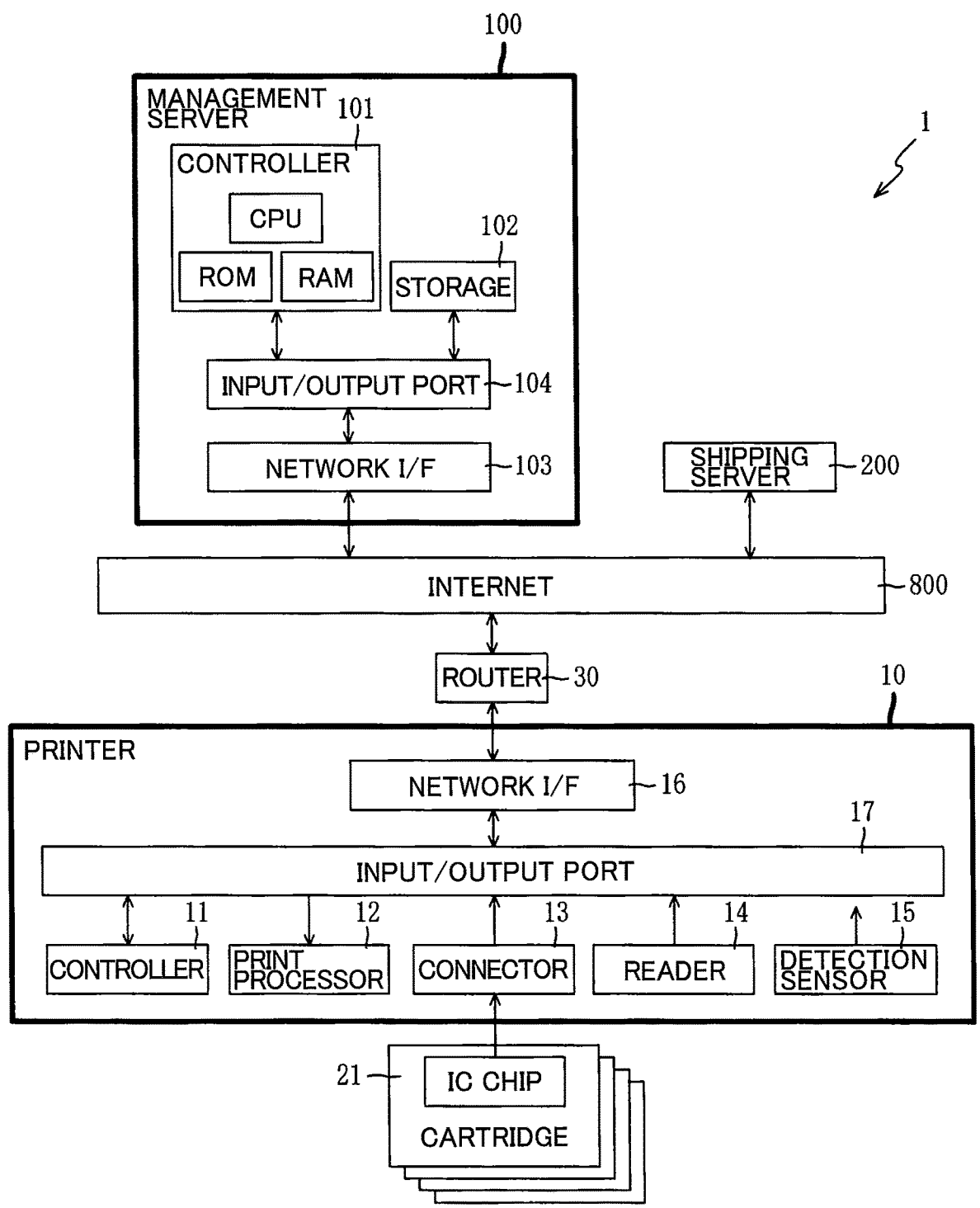
FIG. 2 is a block diagram illustrating an electrical configuration of a management server according to the first embodiment.

FIG. 2 is a block diagram illustrating an electrical configuration of the management server 100. The management server 100 is provided, for example, by a vendor of the printer 10. The management server 100 may be a device having a known server function. The management server 100 is provided with a controller 101, a storage 102, and a network interface (hereinafter, referred to as a "network I/F") 103, all of which are connected to each other via an input/output port 104.

The controller 101 includes a CPU and a ROM and a RAM that are electrically connected to the CPU, and constitutes a computer. The CPU controls an operation of the management server 100 according to a program and data stored in the ROM and the storage 102. The controller 101 is an example of claimed "controller."

The storage 102 is a non-volatile memory device. The storage 102 is, for example, a hard disk drive. The storage 102 stores various kinds of programs for controlling the operation of the management server 100, such as a program for executing respective processes described later while referring to FIG. 5 through the controller 101. The storage 102 stores, for each user, the unique information of the printer 10 registered by the user. The network I/F 103 is a device for communicating with other devices connected to the Internet 800. A known network card may be employed as the network I/F 103. The management server 100 is connected to the Internet 800 via the network I/F 103. The storage 102 is an example of claimed "storage." The network I/F 103 is an example of claimed "communication I/F."

The printer 10 includes a controller 11, a print processor 12, a connector 13, a reader 14, a detection sensor 15, and a network I/F 16, all of which are connected to each other via an input/output port 17. The controller 11 includes a CPU (not illustrated) and a ROM and a RAM that are electrically connected to the CPU, and constitutes a computer. The CPU controls an operation of the printer 10 according to a program and data stored in the ROM.

The print processor 12 is a printing mechanism and includes an ink jet head. The controller 11 inputs a driving signal to the print processor 12, and the ink jet head ejects ink from a nozzle according to the inputted driving signal. The print processor 12 may be a laser printing mechanism.

The connector 13 is connectable to a cartridge 21 filled with ink used for the print processor 12. The cartridges 21 that correspond to the number of usable ink colors according to the type of the printer 10 can be connected to the connector 13. In other words, one or more cartridges 21 corresponding to the type of the printer 10 can be connected to the connector 13. Attached to the cartridge is an IC chip storing a serial ID identifying the cartridge 21.

The reader 14 is configured to read the serial ID from the IC chip attached to the cartridge 21 connected to the connector 13. The detection sensor 15 is configured to detect the remaining amount of the ink in each of the cartridges 21 connected to the connector 13. The network I/F 16 is a device for communicating with other devices connected to the Internet 800. The printer 10 is configured to be connected to a router 30 via the network I/F 16. Accordingly, the printer 10 is connectable to the Internet 800 via the router 30.

Communication between the management server 100 and the printer 10 is preformed according to a connection establishment type protocol, more specifically, an XMPP over BOSH (an abbreviation of Extensible Messaging and Presence Protocol Over Bidirectional-Streams Over Synchronous HTTP). The XMPP over BOSH is an always-on connection type or a connection maintaining type protocol in which a connection-established state is substantially constantly maintained. Meanwhile, communication between the management server 100 and the shipping server 200 is performed according to a HTTP (an abbreviation of a Hypertext Transfer Protocol).

Figure 3A:
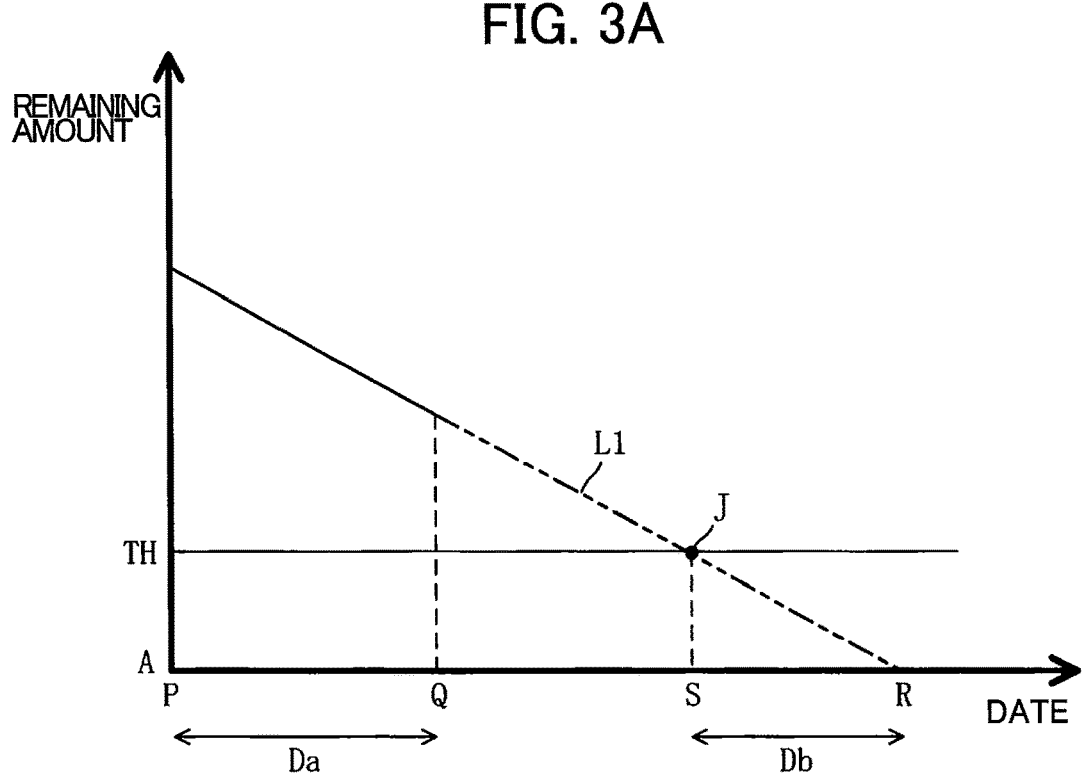
FIG. 3A is a graphical representation for describing a calculation of an automatic order threshold.

Next, determination of an order of the consumable item in the management server 100 will be described while referring to FIGS. 3A and 3B. The management server 100 calculates use prediction information of the consumable item currently in use at every predetermined timing (for example, every day at a fixed time) on the basis of a plurality of pieces of the remaining amount information received from the printer 10.

Specifically, the use prediction information is calculated on the basis of a variation with time in the remaining amount represented by the received remaining amount information.

For example, the consumable item information is received (or acquired) every day at a fixed time, each time the consumable item information is received from the printer 10, the remaining amount represented by the remaining amount information included in the current consumable item information (that is, the currently received consumable item information) is recorded (or stored) as a current remaining amount with respect to the consumable item of the type indicated by the type information included in the current consumable item information. The current remaining amount (that, is the currently recorded remaining amount) is associated with a date on which the current consumable item information is received. This recording of the remaining amount is started from a replacement date on which the consumable item replaces a consumable item previously used. For example, a date P illustrated in FIG. 3A is the replacement date.

Next, a first primary regression straight line is calculated as first use prediction information on the basis of the recorded remaining amounts representing the variation with time in the remaining amount of the consumable item currently in use. For example, as illustrated in FIG. 3A, a first primary regression straight line L1 is calculated on the basis of the remaining amount records during a period of time from the date P to the date Q which is Da days after the date P. All the recorded remaining amounts during days from the date P to the date Q need not be used for the calculation of the first primary regression straight line L1. In FIGS. 3A and 3B, the recorded remaining amounts representing the variation in the remaining amount with time are not illustrated. The first use prediction information is an example of claimed "first consumption inclining." The first primary regression straight line L1 is also an example of claimed "first consumption inclining." The period of time from the date P to the date Q (Da in FIG. 3A) is an example of claimed "first period of time." The date P is an example of "first timing." The date Q is an example of "second timing."

Subsequently, a threshold value (hereinafter, referred to as "automatic order threshold value") for determining an order of the consumable item is calculated on the basis of the calculated first primary regression straight line and the number of days (hereinafter, referred to as "number of required delivery days") required for delivery of the consumable item.

As illustrated in FIG. 3, for example, a remaining amount TH is calculated as the automatic order threshold value on the basis of the first primary regression straight line L1 and the number of required delivery days Db. More specifically, on the basis of the first primary regression straight line L1, calculated is a date R on which the remaining amount of consumable item currently in use is predicted to reach a remaining amount A. The remaining amount A is such a small amount that the consumable item is determined to be unusable in the printer 10. That is, on the date R the consumable item currently in use is predicted to be unusable. The remaining amount TH is calculated as the automatic threshold value on the basis of a date S traced back from the date R by the number of required delivery days Db and the first primary regression straight line L1. In FIG. 3, the remaining amount TH is indicated by a point J on the primary regression straight line L1 corresponding to the date S. The remaining amount A may be zero or may be a value slightly larger than zero. The automatic order threshold value is an example of claimed "first threshold value." The remaining amount TH is also an example of claimed "first threshold value."

The number of required delivery days Db is calculated on the basis of the delivery destination information. For example, when the delivery destination information includes an address, a zip code, or a telephone number, the number of required delivery days Db is calculated as the number of days required for delivering the consumable item to a house or a region specified by the address and the like described above. In the first embodiment, the delivery destination information is stored in the shipping server 200 for each unique information. Thus, for calculating the number of required delivery days Db, the management server 100 acquires, from the shipping server 200, the delivery destination information corresponding to the unique information of the printer 10 that is the transmission source of the consumable item information.

The delivery destination information corresponding to each unique information may be stored in the management server 100. In this case, the delivery destination information stored in the management server 100 may be registered by the user or may be acquired periodically (for example, daily or monthly) from the shipping server 200.

Further, for example, the shipping server 200 may store the number of required delivery days corresponding to the delivery destination information. In such case, the management server 100 may be configured to acquire the stored number of required delivery days from the shipping server 200 and set the number of required delivery days Db to the acquired number of required delivery days.

The recording of the remaining amount described above is performed for each type of the consumable item indicated by the type information included in the consumable item information. The recording of the remaining amount is newly started each time the consumable item mounted to the printer 10 is replaced with a new consumable item. The consumable item information includes the number of times (hereinafter, referred to as the "number of replacements") the consumable item of the type indicated by the type information is replaced.

The recording of the remaining amount is newly started each time the number of replacements included in the consumable item information changes. In FIG. 3A, the date P is a date on which the number of replacements included in the consumable item information changes. The printer 10 includes a replacement counter for each type of the consumable item. The replacement counter counts the number of replacements of the consumable item. The replacement counter is initialized to zero at the time of factory shipping of the printer 10. The printer 10 includes the number of replacements corresponding to the value of the replacement counter in the consumable item information.

The management server 100 according to the first embodiment determines whether or not the consumable item has been used in rapid pace on the basis of the consumable item information acquired from the printer 10.

Figure 3B:
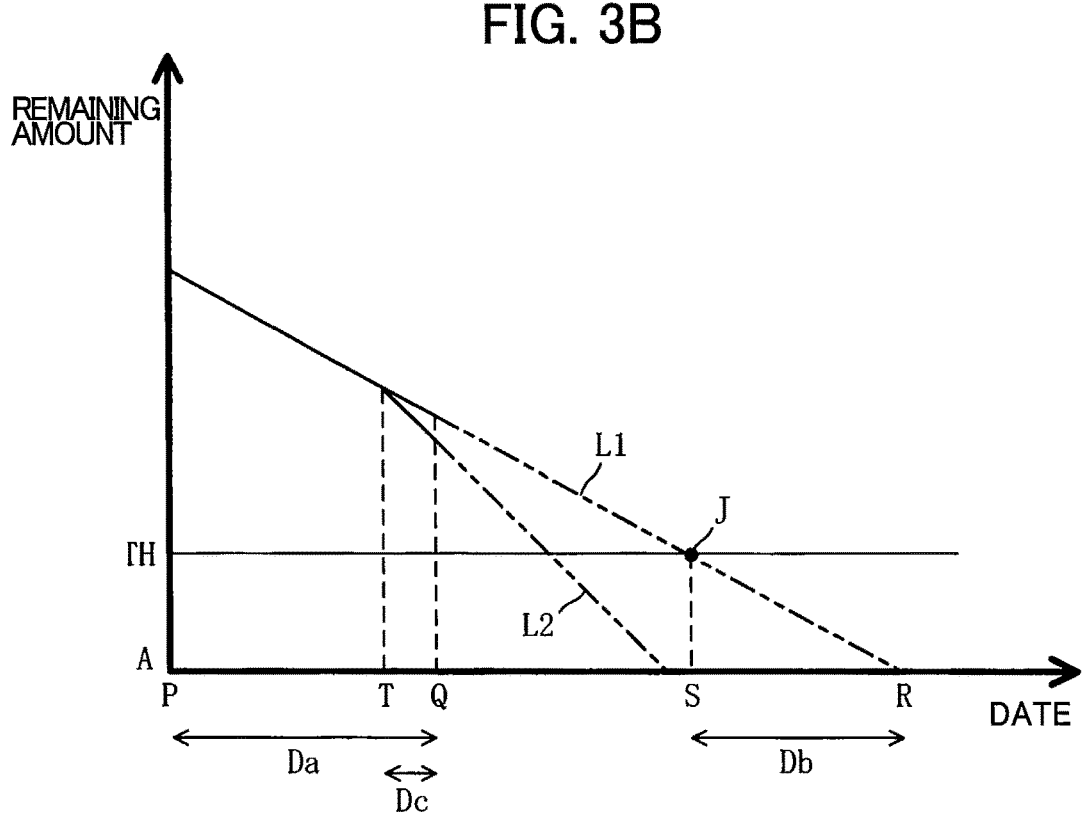
FIG. 3B is a graphical representation for describing a calculation of an manual order threshold.

Specifically, as illustrated in FIG. 3B, a second primary regression straight line L2 is calculated as second use prediction information on the basis of the recorded remaining amounts during a period of time from a date T traced back from the date Q by a predetermined number of days Dc (for example, 3 days) to the date Q on which the consumable item information is most recently acquired. All the recorded remaining amounts during days from the date T to the date Q need not be used for the calculation of the second primary regression straight line L2. The second use prediction information is an example of claimed "second consumption inclining." The second primary regression straight line L2 is also an example of claimed "second consumption inclining." The period of time from a date T to the date Q (Dc in FIG. 3B) is an example of claimed "second period of time." The date T is claimed "third timing." The a predetermined number of days Dc is claimed "predetermined period of time."

In the present embodiment, when an absolute value of a gradient of the second primary regression straight line L2 is equal to or larger than a specific gradient value, the consumable item is determined to have been used in rapid pace. Thus, since the determination whether or not the consumable item has been used in rapid pace is performed on the basis of the absolute value of the gradient of the second primary regression straight line L2, the determination can quantitatively be performed.

Next, calculated is the specific gradient value (hereinafter, referred to as "manual order threshold value") for determining whether or not the consumable item has been used in rapid pace. The manual order threshold value with respect to the gradient of the second primary regression straight line L2 is calculated on the basis of the date Q on which the consumable item information has been most recently received from the printer 10, the remaining amount represented by the remaining amount information included in the most recently received consumable item information, and the number of required delivery days Db. The manual order threshold value is an example of claimed "specific value." The specific gradient value is also an example of claimed "specific value."

Specifically, for calculating the manual order threshold value, calculated is a threshold straight line representing an assumed usage inclining (an assumed consumption inclining) obtained under the assumption that the remaining amount of the consumable item on the date Q (that is, the remaining amount indicated by the remaining amount information included in the consumable item information received on the date Q) reaches the remaining amount A after the number of required delivery days Db elapses from the date Q. Then, a gradient of the calculated threshold straight line is calculated as the manual order threshold value. When the absolute value of the gradient of the second primary regression straight line L2 is larger than an absolute value of the gradient of the calculated threshold straight line (that is, the calculated manual order threshold value), the consumable item is determined to have been used in rapid pace. The absolute value of the gradient of the calculated threshold straight line is an example of "specific value."

The manual order threshold value may be calculated in relation to reception time interval of the consumable item information in addition to the date Q on which the consumable item information has been most recently received from the printer 10, the remaining amount of the consumable item indicated by the remaining amount information included in the consumable item information received on the date Q, and the number of required delivery days Db. When the reception time interval of the consumable item information is relatively long, the reception time interval influences an order timing of the consumable item, and there is a possibility that the consumable item will not be ordered in time. On the other hand, the problematic possibility can be reduced by considering the reception time interval of the consumable item information.

For example, the gradient calculated as manual order threshold value may be adjusted according to the reception time interval. Specifically, the absolute value of the calculated gradient is increased as the reception time interval increases, and the absolute value of the calculated gradient is decreased as the reception time interval decreases. For example, when the usage inclining (the consumption inclining) of the consumable item currently in use is further increased until the consumable item information is received at next time, there is a possibility that an order is not placed in adequate time. In the above modified example, since the manual order threshold is adjusted on the basis of the reception time interval, the problematic possibility can be reduced.

Figure 4A:
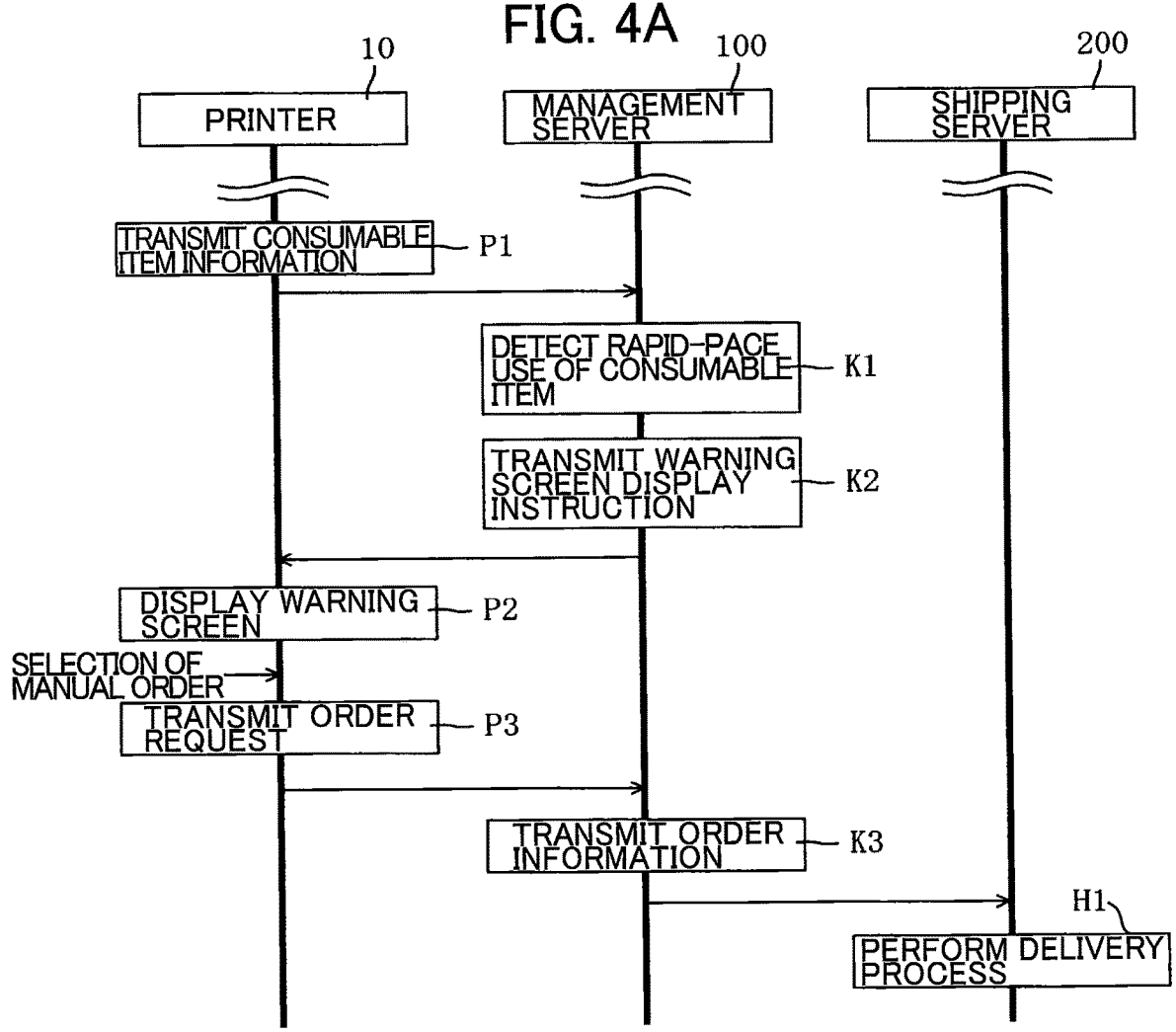
FIG. 4A is a sequence diagram illustrating main operations of the respective devices when a rapid-pace use of the consumable item is detected.

FIG. 4A is a sequence diagram illustrating main operations of the respective devices when the management server 100 detects the rapid-pace use of the consumable item in the consumable item ordering system 1. The printer 10 transmits the consumable item information to the management server 100 at a predetermined timing (P1). When the rapid-pace use of the consumable item is detected on the basis of the consumable item information received from the printer 10 (K1), the management server 100 transmits an warning screen display instruction to the printer 10 (K2).

Figure 4B:
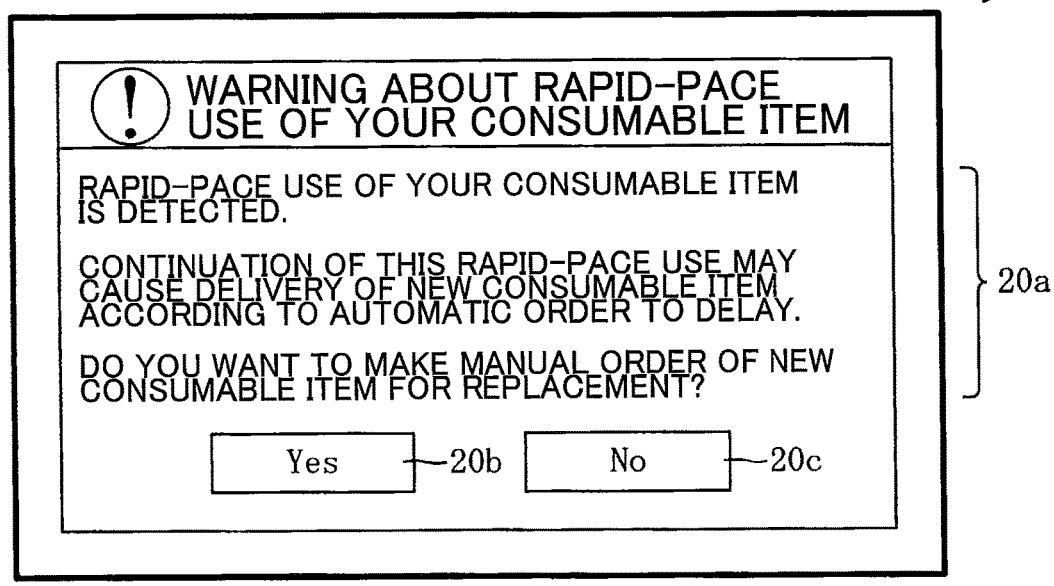
FIG. 4B is a schematic diagram illustrating an example of a warning screen.

The printer 10 display an warning screen on a display (for example, a liquid crystal display device) according to the warning screen display instruction received from the management server 100 (P2). FIG. 4B is a schematic diagram illustrating an example of an warning screen 20 displayed on the display of the printer 10. Displayed on the warning screen 20A are a message 20a, a Yes button 20b, and a No button 20c.

The message 20a is a message for warning that the consumable item has been used in rapid pace. The Yes button 20b is a button for inputting selection for manually ordering a new consumable item. The No button 20c is a button for inputting selection for not manually ordering the new consumable item.

In response to receipt of the selection of the manual order inputted to the warning screen 20, the printer 10 transmits the order request to the management server 100 (P3). In other words, in response to receipt of an manipulation to the Yes button 20b of the warning screen 20, the printer 10 determines that the selection of the manual order is received, and thus transmits the order request.

The management server 100 transmits the order information to the shipping server 200 on the basis of the order request received from the printer 10 (K3). After transmitting the order information to the shipping server 200, the management server 100 may control an order completion screen including the type of the consumable item that is the order target and an estimated delivery date to be displayed on the printer 10.

The shipping server 200 performs a consumable item delivery process on the basis of the order information received from the management server 100 (H1). When the shipping server 200 performs the delivery process, the consumable item ordered according to the order information is delivered to the delivery destination indicated by the delivery destination information associated with the unique information of the printer 10 that has transmitted the order request. Thus, the consumable item ordered according to the order information is delivered to the user having the printer 10 that has transmitted the order request.

Figure 5:
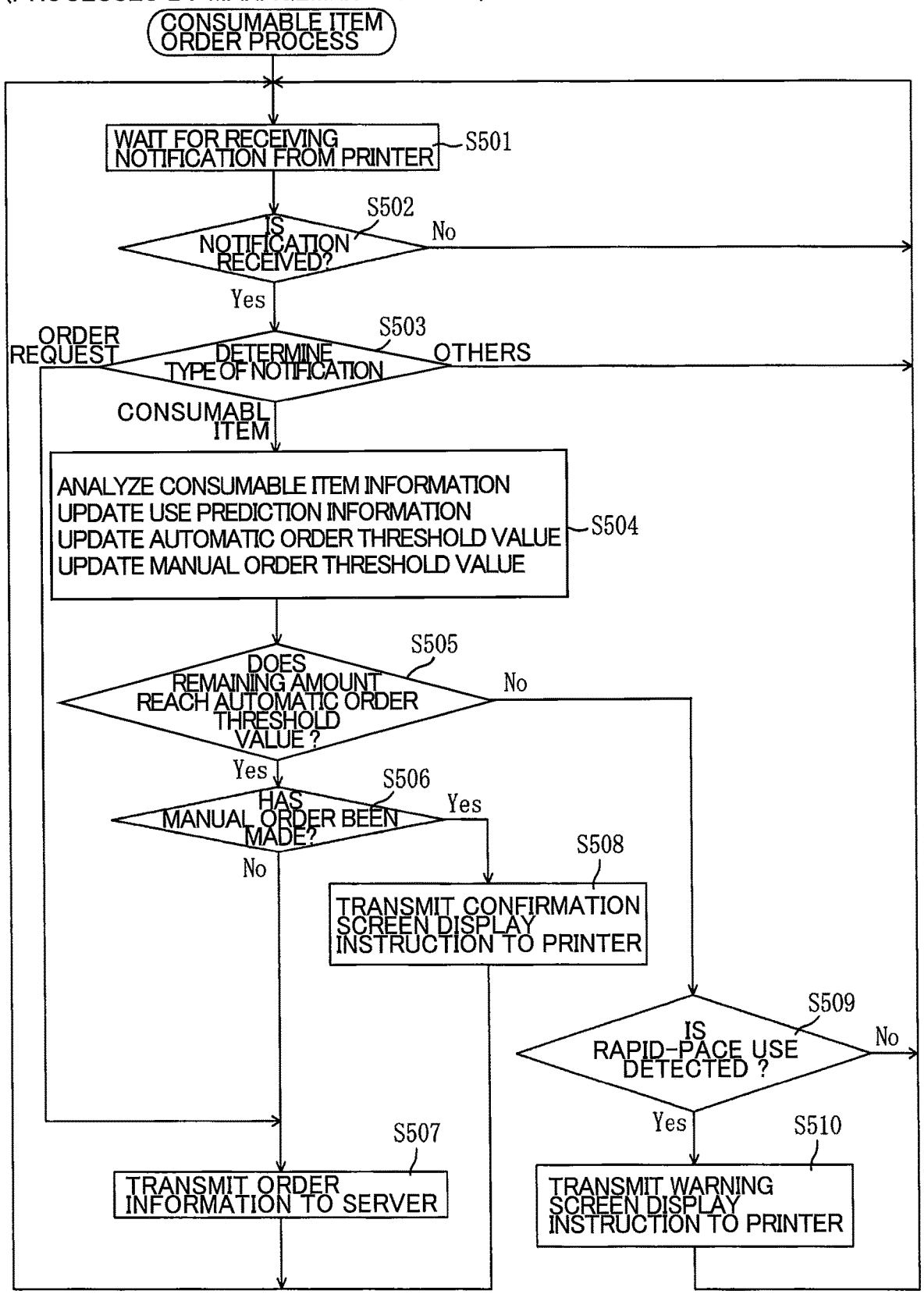
FIG. 5 is a flowchart illustrating a consumable item order process performed by a controller of the management server according to the first embodiment.

FIG. 5 is a flowchart illustrating the consumable item order process. This process is performed by the CPU of the controller 101 (hereinafter, referred to simply as a "CPU") of the management server 100. This process starts as electric power is supplied to the management server 100. The CPU is on standby for reception of a notification from the printer 10 (S501). The CPU determines whether or not the notification has been received from the printer 10 (S502). When the CPU determines that the notification has not been received from the printer 10 (S502: No), the CPU performs the process in S501 again.

On the other hand, when the CPU determines that the notification is has been received from the printer 10 (S502: Yes), the CPU determines a type of the received notification (S503). When the CPU determines that the received notification is a notification of the consumable item information (S503: consumable item information), the CPU analyzes the received consumable item information, and stores information included therein (S604).

The consumable item information includes the remaining amount information, the type information, the number of replacements, and a print count. The "print count" is a value indicating the number of pages printed using the current consumable item for the consumable item of the type indicated by the type information included in the consumable item information. The printer 10 includes a print counter. The print counter counts, for each type of the consumable item, the number of pages printed using the current consumable item. The print counter is initialized to zero each time the consumable item is replaced. The printer 10 includes the value of the print counter in the consumable item information as the print count.

In S504, the CPU updates the use prediction information on the basis of the analysis result. In other words, the CPU calculates the first primary regression straight line L1 as the first use prediction information, and calculates the second primary regression straight line L2 as the second use prediction information. In S504, the CPU updates the automatic order threshold value and the manual order threshold value.

The CPU determines whether or not the remaining amount of the consumable item indicated by the remaining amount information included in the received consumable item information has reached the automatic order threshold value updated in S504, that is, is smaller than the threshold value (S505). When the remaining amount according to the received consumable item information is determined to have reached the automatic order threshold value (S505: Yes), the CPU determines whether or not the manual order has been already made (S506). Specifically, the CPU determines whether or not the manual order through the warning screen 20 has already been made with respect to the consumable item whose remaining amount has reached the automatic order threshold value (S506).

When the manual order is determined to have not been made (S506: No), the CPU transmits the order information to the shipping server 200 as an order action (S507), and subsequently performs the process in S501. The process of S507 performed by the CPU corresponds to the process of K3 in the sequence diagram of FIG. 4A. As described above, the order information transmitted to the shipping server 200 includes: the type information corresponding to the type of the consumable item in which the remaining amount has reached the automatic order threshold value; the unique information of the printer 10 that is the transmission source of the consumable item information for the consumable item that is the order target; and the order request.

When the remaining amount indicated by the received consumable item information is determined to have not reached the automatic order threshold value yet (S505: No), the CPU determines whether or not the rapid-pace use of the consumable item has been detected (S509). In other words, the CPU determines whether or not the absolute value of the gradient of the second primary regression straight line L2 has reached the manual order threshold value. When the rapid-pace use of the consumable item has been detected, that is, when the absolute value of the gradient of the second primary regression straight line L2 has exceeded the manual order threshold value, the CPU determines that the rapid-pace use of the consumable item has been detected.

When the rapid-pace use of the consumable item is determined to have not been detected in S509 (S509: No), the CPU performs the process in S501. On the other hand, when the rapid-pace use of the consumable item is determined to have been detected (S509: Yes), the CPU transmits the warning screen display instruction to the printer 10 in which the rapid-pace use of the consumable item has been detected (S510). The determination by the CPU that the rapid-pace use of the consumable item has been detected in S509 corresponds to the process of K1 in the sequence diagram of FIG. 4A.

As a result of the process in S510, the warning screen 20 is displayed on the display unit of the printer 10. The process of S510 performed by the CPU corresponds to the process of K2 in the sequence diagram of FIG. 4A. After performing the process of S510, the CPU subsequently performs the process in S501. According to the processes of S505, S509, and S510, even in the situation in which the remaining amount indicated by the remaining amount information included in the received consumable item information does not reach the automatic order threshold value, when the rapid-pace use of the consumable item is detected, the management server 100 transmits the warning screen display instruction to the printer 10, and the warning screen 20 is consequently displayed on the printer 10.

When the received notification is determined to be the notification of the order request in S503 (S503: order request), the CPU performs the process in S507. When the Yes button 20b of the warning screen 20 is manipulated or when an instruction to place an order is inputted to a confirmation screen (not illustrated) described later, the notification of the order request is transmitted from the printer 10 to the management server 100. In other words, the transmission of the order information in S507 is performed when the remaining amount of the consumable item indicated by the remaining amount information received from the printer 10 has reached the automatic order threshold value or when the order instruction is inputted to the warning screen 20 displayed on the printer 10 on the basis of the detection of the rapid-pace use of the consumable item.

Further, when the process of S507 is performed on the basis of the reception of the notification of the order request, the CPU stores manual order completion information indicating that the process of S507 has been already performed in the storage 102. The CPU performs the determination of S506 on the basis of whether or not the manual order completion information is stored in the storage 102. The manual order completion information stored in the storage 102 is cleared when the corresponding consumable item is replaced. The storage destination of the manual order completion information may be the RAM of the control unit 101.

When the received notification is determined to be any other notification (S503: other), the CPU performs the process in S501. Any other notification is transmitted from the printer 10 to the management server 100 when the No button 20c of the warning screen 20 is operated or when an instruction not to place an order is inputted to the confirmation screen.

When the manual order is determined to have been made in S506 (S506: Yes), the CPU transmits an instruction (hereinafter, referred to as a "confirmation screen display instruction") to display the confirmation screen to the printer 10 (S508). After performing the process of S508, the CPU performs the process in S501. The confirmation screen (not illustrated) displayed on the display of the printer 10 is a screen displayed when the remaining amount of the consumable item reaches the automatic order threshold value after the manual order is placed.

The confirmation screen is a screen for confirming whether or not the automatic order is placed according to the remaining amount of the consumable item reaching the automatic order threshold value despite of the completion of the manual order. The screen includes a message for confirming whether or not the automatic order is placed after the manual order is already placed, a button for inputting an instruction to place an order, and a button for inputting an instruction not to place an order. After the confirmation screen display instruction is initially transmitted in S508, when the corresponding consumable item is replaced, the CPU transmits an instruction to erase the confirmation screen to the printer 10. Alternatively, the printer 10 that has received the confirmation screen display instruction may display the confirmation screen and then may erase the confirmation screen after a predetermined period of time (for example, after 6 hours).

When the manual order is performed on the basis of the rapid-pace use of the consumable item, even if the automatic order condition is met later, an order is likely to be unnecessary because the consumable item is redundantly ordered. In this regard, according to the processes of S505, S506, and S508, when the automatic order condition is met after the manual order is placed, the confirmation screen is displayed on the printer 10 without placing an order (that is, without transmitting the order information). Therefore an unnecessary consumable item can be prevented from being delivered uselessly. On the other hand, even when the manual order is not placed although the consumable item is used in rapid pace, if the automatic order condition is met later, the order information is transmitted to the shipping server 200 in S507.

In the consumable item order process, the values included in the consumable item information received from the printer 10 are stored in a table 102*a* (see FIG. 6) installed in the storage 102 of the management server 100. In the table 102*a*, type information 102*a*2, a remaining amount 102*a*3, the number of replacements 102*a*4, a print count 102*a*5, and manual order completion information 102*a*6 are associated with unique information 102*a*1.

When the management server 100 receives the consumable item information from the printer 10 in S504, the values included in the received consumable item information are stored in the table 102*a* for the unique information 102*a*1 identifying the printer that is the transmission source of the consumable item information. Specifically, the values of the remaining amount information, the number of replacements, and the print count included in the consumable item information are stored in the remaining amount 102*a*3, the number of replacements 102*a*4, and the print count 102*a*5, respectively, for each type of the consumable item indicated by the type information 102*a*2 included in the consumable item information.

The unique information 102*a*1 that is the model number of the printer 10 and the type information 102*a*2 that is the model number of the ink cartridge is information registered by the user. The unique information 102*a*1 may be a serial number of the printer 10. Information indicating whether or not the manual order has been placed, that is, information indicating whether or not the process of S507 has been performed on the basis of the reception of the notification of the order request is stored in the manual order completion information 102*a*6.

According to the management server 100 of the first embodiment, when the rapid-pace use of the consumable item is detected on the basis of the change in the remaining amount of the consumable item indicated by the remaining amount information included in the consumable item information received from the printer 10, the user can manually order a new consumable item through the warning screen 20 displayed on the printer 10. Thus, even when the remaining amount of the consumable item does not reach the automatic order threshold value, the management server 100 can transmit the order information to the shipping server 200 on the basis of the manual order placed by the user. Therefore, the order of the new consumable item can be placed in adequate time despite the rapid-pace usage of the consumable item. Consequently, an occurrence of a problematic situation in which the user cannot use the printer 10 owing to the completely consumed consumable item can be avoided.

Particularly, when the rapid-pace use of the consumable item is detected, the management server 100 transmits the order information in response to receipt of the manual order placed by the user. Thus, in a situation in which the detected rapid-pace use is temporary and it is unnecessary to place an order in view of the remaining amount of the consumable item, the consumable item can be prevented from being inappropriately ordered.

While the first embodiment has been described above, the present disclosure is not limited to the first embodiment. It would be apparent to those skilled in the art that various changes and modifications may be made therein without departing from the scope of the disclosure. The management server 100 in the present disclosure can be realized in various manners or forms, such as a controller, a control method, and a control program for controlling an information processing apparatus, a storage medium storing the control program.

For example, in the above embodiments, one server that physically exists has been described as the management server 100 as an example of "claimed information processing apparatus." The management server 100 may be a virtual machine that functions as one server by collaboration of a plurality of physical devices. For example, the management server 100 may be configured to function as one server by collaboration of a first server that receives the consumable item information from the printer 10 and a second server that determines whether or not an order is placed on the basis of the consumable item information acquired from the first server. Further, the management server 100 may be configured to have the function of the shipping server 200.

In the above embodiments, the printer 10 has been described as an example of a device connected to the management server 100, but the printer 10 may be a multi-function peripheral device having at least a printing function. In the above embodiments, the ink cartridge has been described as an example of the consumable item, but the consumable item may be the toner cartridge.

In the above embodiments, the printer 10 is configured to transmit the consumable item information directly to the management server 100 via the Internet 800. Alternatively, the consumable item information of the printer 10 may be indirectly transmitted to the management server 100 through an information processing apparatus such as an PC. In this case, a connection between the printer 10 and the information processing apparatus that relays the consumable item information received from the printer 10 may be a wired connection by a USB or a LAN, or a wireless connection by a wireless LAN.

The word "receive" encompasses both the case in which claimed "controller" receives information directly from an external device and the case in which the claimed "controller" receives information indirectly from an external device. The word "acquire" encompasses both the case in which the claimed "controller" acquires information directly from an external device and the case in which the claimed "controller" acquires information indirectly from an external device. Also, the word "acquire" further encompasses both the case in which the claimed "controller" acquires information from an external device and the case in which the claimed "controller" acquires information from its own device, for example, in a case a controller of an information processing apparatus acquires information from a storage or a detection sensor provided in the information processing apparatus.

In the above embodiment, when the absolute value of the gradient of the second primary regression straight line L2 is equal to or larger than the specific gradient value (that is, the manual order threshold value), the consumable item is determined to have been used in rapid pace. Alternatively, when a difference between the remaining amount of the consumable item indicated by the remaining amount information included in the currently acquired consumable item information (that is, the most recently acquired consumable item information) and the remaining amount of the consumable item indicated by the remaining amount information included in the immediately previously acquired consumable item information is equal to or larger than a specific difference value serving as the manual order threshold value, the consumable item may be determined to have been used in rapid pace. Even in the present modified example, similarly to the above embodiment, it can be quantitatively determined whether or not the consumable item has been used in rapid pace.

Further, even in the above modified example using the difference between the current remaining amount and the immediately previous remaining amount, similarly to the first embodiment employing the gradient of the second primary regression straight line L2, the specific difference value can be calculated on the basis of: the date Q on which the consumable item information has been most recently received from the printer 10; the remaining amount of the consumable item indicated by the remaining amount information included in the consumable item information received on the date Q; and the number of required delivery days Db. In the present modified example, the manual threshold value is an example of claimed "specific value." The specific difference value is an example of claimed "specific value.".

Specifically, the specific difference value (the manual order threshold value in the present modified example) is calculated by dividing substantially usable amount by the number of times the consumable item information is received during the number of required delivery days. The substantially usable amount is obtained by subtracting the remaining amount A from the remaining amount (for example, the remaining amount on the date Q) represented by the remaining amount information included in the currently received consumable item information (for example, the consumable item information received on the date Q). Consequently, the specific difference value is a consumption amount of the consumable item during the reception time interval of the consumable item information under the assumption that the remaining amount on the date Q reaches the remaining amount A after the number of required delivery day Db elapses form the date Q. When the difference between the remaining amount of the currently received consumable item information (that is, the consumable item information received on the date Q) and the remaining amount of the immediately previously received consumable item information is larger than the calculated specific difference value, the consumable item currently in use is determined to have been used in rapid pace. Further, the specific difference value may be calculated in relation to the reception time interval of the consumable item information. In other words, as the reception time interval increases, the manual order threshold value (the specific difference value) may be increased.

In the above embodiments, the first and second primary regression straight lines have been described as the first and second use prediction information of the consumable item. However, if information can be used to statistically predict a consumption state of the consumable item, various kinds of statistically calculated prediction formulas can be used without being limited to the primary regression straight line. In the above embodiments, each time the consumable item mounted to the printer 10 is replaced, the recorded remaining amounts representing the variation in the remaining amount with time is started, and the first use prediction information (the first primary regression straight line L1) is calculated, but the first use prediction information may be calculated using previous data (or former data), that is, values of the variation with time in the remaining amount of the consumable item mounted prior to the currently mounted consumable item.

In the above embodiments, the value indicating the remaining amount of the consumable item is used as the remaining amount information, but the print count included in the consumable item information may be used as the remaining amount information as well. In other words, the value of the print count may be an index of the remaining amount of the consumable item.

In the above embodiment, the management server 100 receives the consumable item information from the printer 10 at a constant time interval, that is, the reception time interval is constant, but not limited to this. The reception time interval of the consumable item information may be reduced as the remaining amount becomes closer to the automatic order threshold value. For example, when the remaining amount indicated by the remaining amount information reaches an another threshold value that is larger than the automatic order threshold value, the reception time interval of the consumable item information is reduced. For example, when the remaining amount indicated by the remaining amount information reaches the another threshold value, the reception time interval in which once per day (that is, time intervals of 24 hours) is set as a default is reduced to 8 times per day (that is, time intervals of 3 hours).

Figure 8:
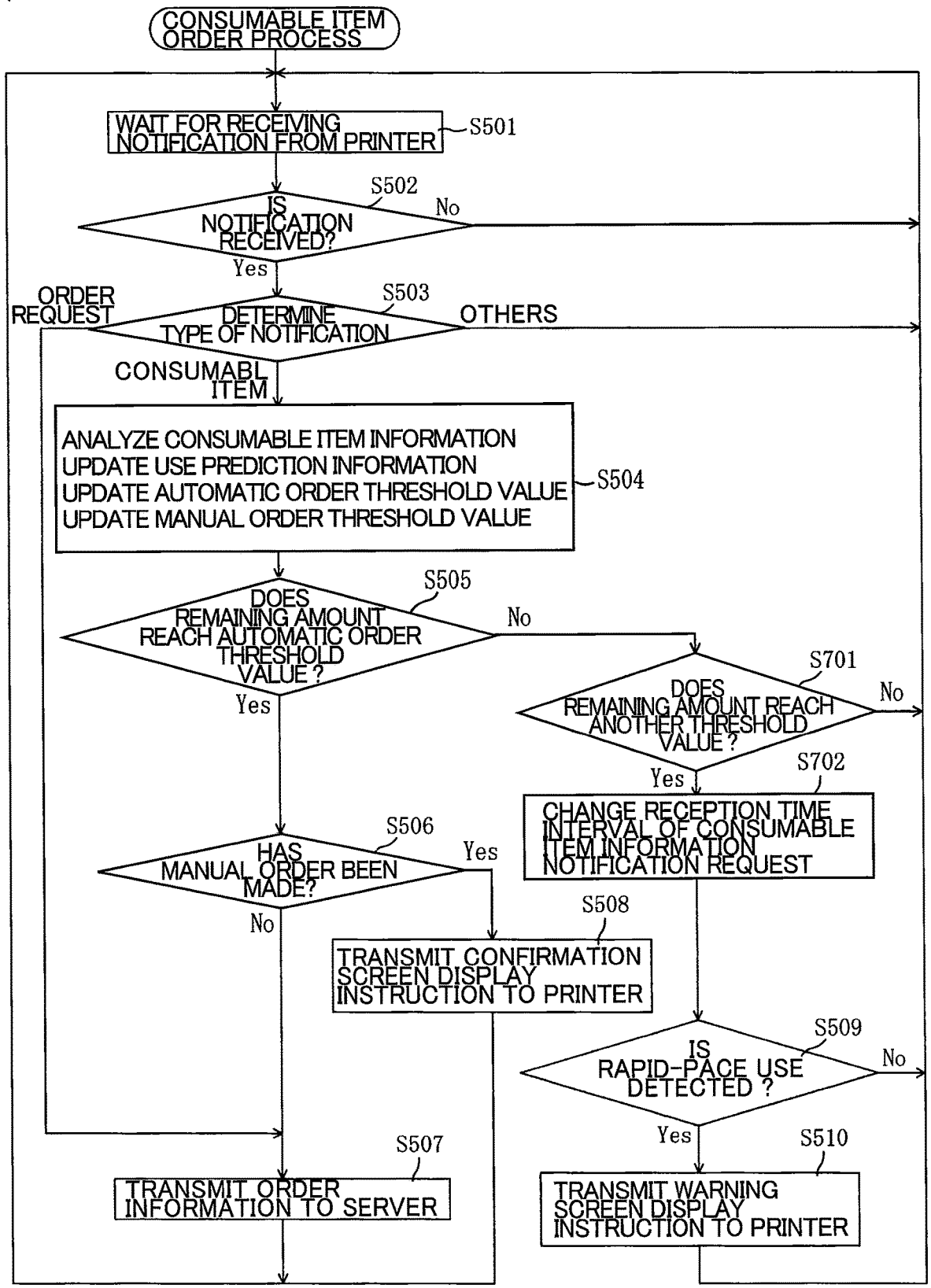
FIG. 8 is a flowchart illustrating a consumable item order process performed by the controller of the management server according to the modified example of the first embodiment.

The above modified example will be specifically described with reference to FIGS. 7 and 8. In the description of FIGS. 7 and 8, the same parts as in the above embodiment are denoted by the same reference numerals, and thus a description thereof is omitted.

As illustrated in FIG. 7, for example, a remaining amount TH' is calculated as an another threshold value on the basis of the first primary regression straight line L1 and a predetermined number of days (for example, 7 days). For calculating the another threshold value, on the basis of the first primary regression straight line L1, calculated is a date S on which the remaining amount of consumable item currently in use is predicted to reach a remaining amount TH (that is, the automatic order threshold value). Subsequently, the remaining amount TH' is calculated as the another threshold value on the basis of the first primary regression straight line L1 and a date U traced back from the date S by the predetermined number of days. In FIG. 7, the remaining amount TH' is indicated by a point J' on the primary regression straight line L1 corresponding to the date U. Alternatively, the another threshold value may be set to a value obtained by adding prescribed amount to the remaining amount TH.

When the remaining amount of the consumable item indicated by the remaining amount information included in the consumable item information most recently received from the printer 10 on the date Q reaches the another threshold value (the remaining amount TH'), the CPU of the control unit 101 changes a transmission time interval of the consumable item information notification request from a default time interval to a specific time interval shorter than the default time interval. For example, when the default transmission time interval is 24 hours and a transmission time interval after the remaining amount of the consumable item reaches the another threshold value is 3 hours, as illustrated in FIG. 6, the reception time interval of the consumable item information by the management server 100 is 24 hours before the remaining amount reaches the another threshold value, and the reception time interval is 3 hours after the remaining amount reaches the another threshold value. Further, when the consumable item ordering system 1 does not employ the consumable item information notification request, the management server 100 transmits an instruction to change the transmission time interval of the consumable item information to the printer 10.

As illustrated in FIG. 8, when the CPU of the control unit 101 determines that the remaining amount according to the received consumable item information has not reached the automatic order threshold value (the remaining amount TH) (S505: No), the CPU determines whether or not the remaining amount has reached the another threshold value (that is, whether or not the remaining amount has fallen below the remaining amount TH') (S701). When the remaining amount of the consumable item is determined to have not reached the another threshold value (S701: No), the CPU performs the process in S501. On the other hand, when the remaining amount is determined to have reached the another threshold value (S701: Yes), the transmission time interval of the consumable item information notification request is changed to the specific time interval shorter than the default time interval (S702). After the transmission time interval is changed in S702, when the remaining amount is again determined to have reached the another threshold value (S701: Yes), the CPU performs the process of S509 without performing the process of S702 (that is, the process in S702 is skipped).

As described above, when the remaining amount is close to the automatic order threshold value, the reception time interval of the consumable item information is shortened. Thus, the influence of the reception time interval of the management server 100 against an order timing of the consumable item can be reduced. Consequently, an occurrence of a situation where the consumable item is not ordered in time can be suppressed. Further, since number of the recorded remaining amounts used for calculating the second primary regression straight line L2 serving as the second use prediction information can be increased, enhanced accuracy for determining whether or not the rapid-pace use of the consumable item is detected can be obtained.

In the above embodiment and modified examples, in the consumable item order process of FIGS. 5 and 8, each time the CPU determines that the remaining amount of the consumable item indicated by the remaining amount information has not reached the automatic order threshold value, the CPU determines whether or not the rapid-pace use of the consumable item has been detected in S509. However, when there is sufficiently a large remaining amount of the consumable item, a situation where it is unnecessary to immediately order a new consumable item although the rapid-pace use of the consumable item is detected may occur.

In view of this situation, it may be determined whether or not the rapid-pace use of the consumable item is detected when the remaining amount of the consumable item is relatively close to the automatic order threshold value. For example, when the remaining amount indicated by the remaining amount information is determined to have not reached the automatic order threshold value, the CPU may determine whether or not the difference between the indicated remaining amount and the automatic order threshold value is equal to or smaller than a specific threshold value. When the difference is determined to be equal to or smaller than the specific threshold value, the CPU may perform the process of S509. According to the present modified example, in the situation in which although it is unnecessary to immediately order the new consumable item, the CPU does not display the warning screen 20 on the printer 10, thereby preventing the user from being urged to select whether or not the new consumable item is ordered. The specific threshold value is an example of claimed "specific value."

In the first embodiment, when the rapid-pace use of the consumable item is detected, the warning screen 20 is displayed on the printer 10, and then the user is urged to select whether or not the consumable item is ordered. When the rapid-pace use of the consumable item is detected, the user may be urged to select a first delivery form in which a new consumable item is delivered in the normal number of delivery days or a second delivery form in which a new consumable item is delivered in the special number of delivery days shorter than the normal number of delivery days. For example, it is desirable to install a button for selecting the second delivery form on the warning screen 20 illustrated in FIG. 4B. Alternatively, when the Yes button 20b of the warning screen 20 is manipulated, displayed on the printer 10 may be a screen for selecting any one of the first and second delivery forms. In this case, the user can select any one of delivery form.

In the above embodiment, when the rapid-pace use of the consumable item is detected, the warning screen 20 is displayed on the printer 10, but the warning screen 20 may be displayed on a terminal such as a personal computer, a smartphone, or a tablet.

Second Embodiment

Figure 9:
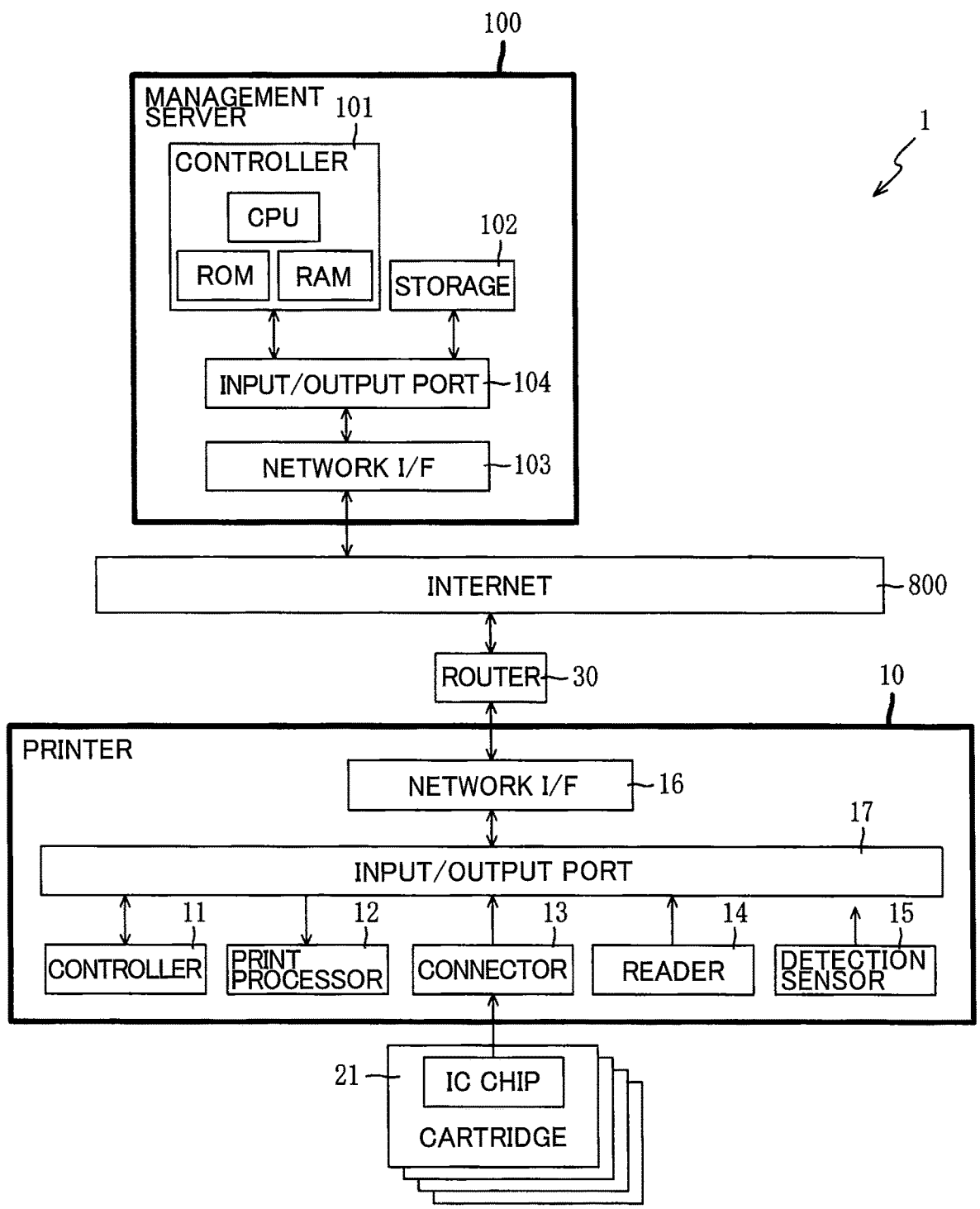
FIG. 9 is a block diagram illustrating an electrical configuration of a management server according to a second embodiment.

In addition to the above embodiment, other embodiments will be described. First, a second embodiment will be described with reference to FIG. 9. The second embodiment differs from the first embodiment in that the shipping server 200 is not arranged, and the management server 100 undertakes the role of the shipping server 200. Thus, when the order request is received from the printer 10 in P3 of FIG. 4A, the CPU of the management server 100 orders the a consumable item. In other words, in S507 of FIGS. 5 and 8, the management server 100 does not transmit the order information to the ordering sever 200 and ships a consumable item. In the second embodiment, the management server 100 is an example of claimed "information processing apparatus" and also is an example of claimed "server."

Third Embodiment

Next, a third embodiment will be described with reference to FIG. 10. The third embodiment differs from the first embodiment in that, instead of the management server 100, the PC (personal computer) 300 undertakes the role of the management server 100. The printer 10 and the shipping server 200 have the same configurations as those of FIG. 2, and thus a detailed description thereof will be omitted.

Figure 10:
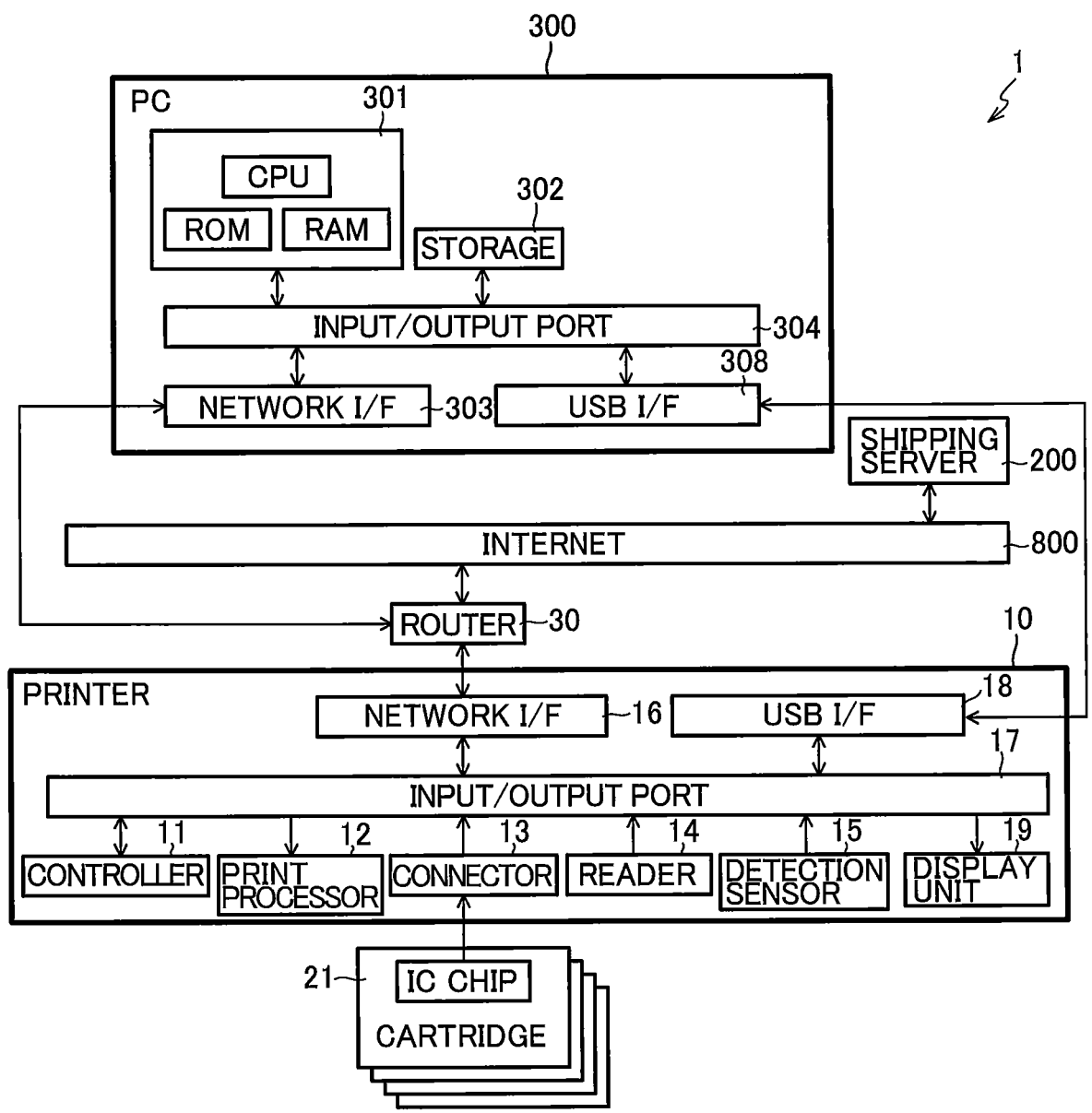
FIG. 10 is a block diagram illustrating an electrical configuration of a personal computer according to a third embodiment.

The PC 300 according to the third embodiment includes a control unit 301 as illustrated in FIG. 10. The control unit 301 includes a CPU and a ROM and a RAM that are electrically connected to the CPU, and constitutes a computer. The CPU controls an operation of the PC 300 according to a program and data stored in the ROM and a storage 302. In the third embodiment, the PC 300 is an example of claimed "information processing apparatus."

The storage 302 is a non-volatile memory device. The storage 302 is, for example, a hard disk drive. The storage 302 stores various kinds of programs for controlling the operation of the PC 300. The storage 302 stores the unique information of the printer 10 registered by the user for each user. The storage 302 is an example of claimed "storage."

A network I/F 303 is a device for communicating with other devices connected to the Internet 800. A known network card may be employed as the network I/F 303. The PC 300 is connected to a router 30 via the network I/F 303. The PC 300 is connected to the Internet 800 via the router 30. A USB I/F 308 is connected to a USB I/F 18 of the printer 10. In other words, the PC 300 is connected to the printer 10 through the USB I/F 308. The respective units are connected to each other through an input/output port 304. The network I/F 303 is an example of claimed "communication I/F." Also, the USB I/F 308 is an example of claimed "communication I/F."

In the third embodiment, the process of K1 to K3 illustrated in FIG. 4A, the consumable item order process illustrated in FIG. 5, and the consumable item order process illustrated in FIG. 8 are performed by the CPU of the control unit 301 provided in the PC 300. In S502, S508, S510 of FIGS. 5 and 8, the CPU may perform transmission and reception with the printer 10 via the network I/F 303 or the USBI/F 308. In S507 of FIGS. 5 and 8, the CPU transmits the order information based on the unique information stored in the storage 302 to the shipping server 200 through the network I/F 303.

Fourth Embodiment

Next, a fourth embodiment will be described while referring to FIGS. 11 and 12. In the fourth embodiment, the management server 100 is not arranged, and the printer 10 undertakes the role of the management server 100. In other words, the process of K1 to K3 illustrated in FIG. 4A is performed by the printer 10. The printer 10 and the shipping server 200 have the same configurations as those in FIG. 2, and thus a detailed description thereof will be omitted. In the fourth embodiment, the printer 10 is an example of claimed "information processing apparatus" and also is an example of claimed "printer."

Figure 11:
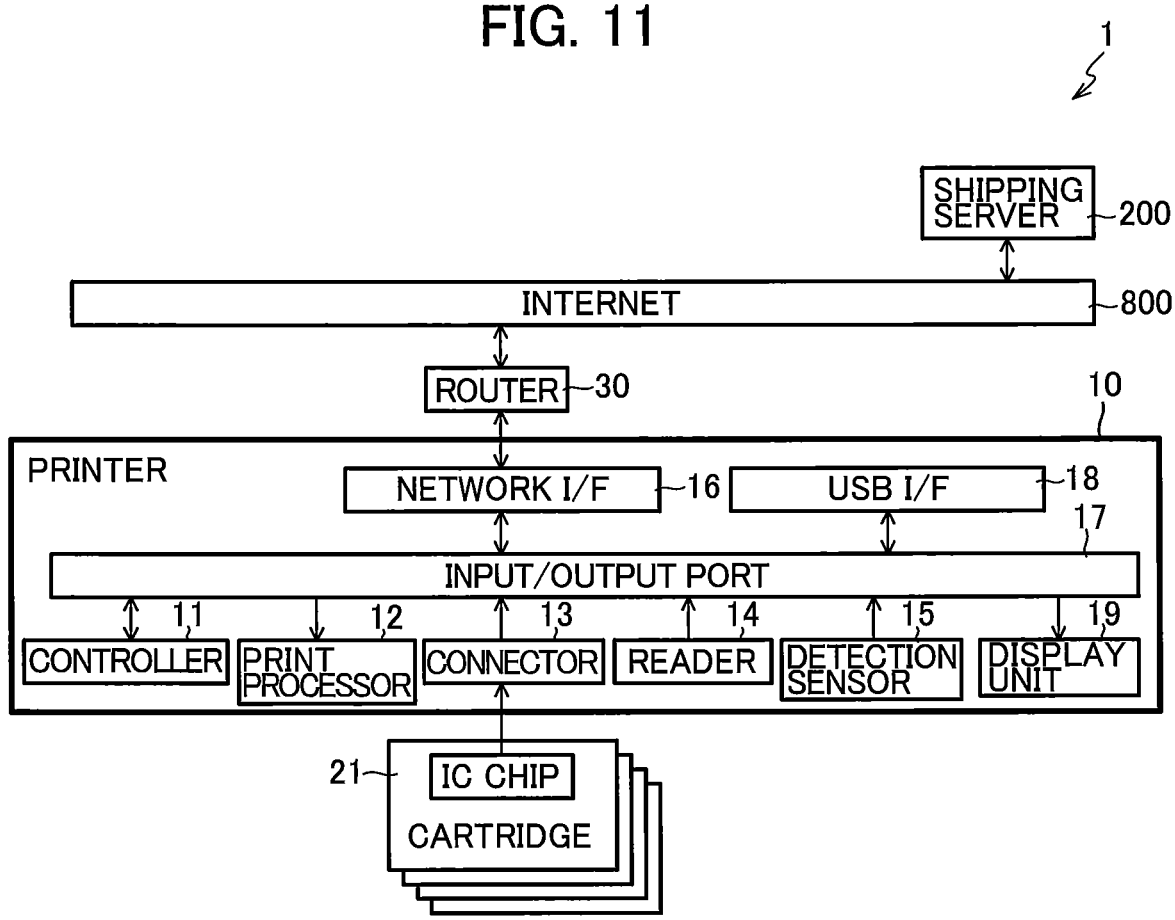
FIG. 11 is a block diagram illustrating an electrical configuration of a printer according to a fourth embodiment.

The printer 10 of the fourth embodiment illustrated in FIG. 11 transmits the order information of the consumable item of the printer 10 to the shipping server 200. The type information of the consumable item and the unique information of the printer 10 are stored in, for example, a ROM of a controller 11 of the printer 10. The controller 11 is an example of claimed "controller." The ROM of the controller 11 is an example of claimed "storage."

Next, the flow of the consumable item order process will be described with reference to FIG. 12. Steps of the same processes as those in FIG. 5 are denoted by the same reference numerals, and a description thereof will be omitted. This process is a process performed by the CUP of the controller 11 of the printer 10. This process starts as electric power is supplied to the printer 10. The CPU of the controller 11 (hereinafter, referred to simply as a "CPU") is on standby for acquisition of the notification from the detection sensor 15 (S601). In other words, the "acquisition" means that acquisition of information in the printer 10. The CPU determines whether or not the notification has been acquired from the detection sensor 15 (S602). When the CPU determines that the notification is has not been acquired from the detection sensor 15 (S602: No), the CPU performs the process in S601 again.

On the other hand, when the CPU determines that the notification has been acquired (or received) from the detection sensor 15 (S602: Yes), the CPU determines a type of the acquired notification (S603). When the acquired notification is determined to be a notification of the consumable item information (S603: consumable item information), that is, when the notification including the remaining amount of the ink in the each cartridge 21 connected to the connector 13 is received from the detection sensor 15, the CPU analyzes the acquired consumable item information, and stores information included in the consumable item information (S604).

The consumable item information includes the remaining amount information, the type information, the number of replacements, and the print count. The "print count" is a value indicating the number of pages printed using the current consumable item for the consumable item of the type indicated by the type information included in the consumable item information. The printer 10 includes, for each type of the consumable item, a print counter that counts the number of pages printed using the current consumable item. The print counter is initialized to zero each time the consumable item is replaced. The printer 10 includes the value of the print counter in the consumable item information as the print count.

In S504, the CPU updates the use prediction information on the basis of the analysis result.

When the manual order is determined to have not been made (S506: No), the CPU transmits the order information as an order action to the shipping server 200 via the network I/F 16 (S507), and subsequently performs the process in S501. The process in S507 performed by the CPU corresponds to the process of K3 illustrated in 4A. As described above, the order information transmitted to the shipping server 200 includes: the type information corresponding to the type of the consumable item in which the remaining amount has reached the automatic order threshold value; the unique information of the printer 10 corresponding to the consumable item that is the order target; and the order request. In the fourth embodiment, the network I/F 16 is an example of "communication I/F."

When the remaining amount indicated by the acquired consumable item information is determined to have not reached the automatic order threshold value yet (S505: No), the CPU determines whether or not the rapid-pace use of the consumable item has been detected (S509).

When the CPU determines that the rapid-pace use of the consumable item has not been detected (S509: No), the CPU performs the process in S501. On the other hand, when the CPU determines that the rapid-pace use of the consumable item has been detected (S509: Yes), the CPU transmits the warning screen display instruction to the display 19 in order to display the warning screen 20 on the display (S610). The determination of CPU that the rapid-pace use of the consumable item has been detected in S509 corresponds to the process of K1 illustrated in FIG. 4A.

As a result of S610, the warning screen 20 is displayed on the display 19 of the printer 10. The process of S610 performed by the CPU corresponds to the process of K2 in the sequence diagram of FIG. 4A. After the process of S610, the CPU performs the process in S501. According to the process of S505, S509, and S610, even in the situation in which the remaining amount of the consumable item indicated by the remaining amount information included in the acquired consumable item information does not reach the automatic order threshold, when the rapid-pace use of the consumable item is detected, the CPU of the controller 11 transmits the warning screen display instruction to display 19, and the warning screen 20 is consequently displayed on display 19.

When the CPU determined that acquired notification is the notification of the order request in S503 (order request in S503), the CPU performs the process in S507. The notification of the order request is transmitted to the CPU when the Yes button 20*b* of the warning screen 20 is manipulated or when an instruction to make an order is inputted to a confirmation screen (not illustrated) described later. In other words, the transmission of the order information in S507 is performed when the remaining amount of the consumable item indicated by the remaining amount information received from the detection sensor 15 has reached the automatic order threshold value or when the order instruction is inputted to the warning screen 20 displayed on the display 19 of the printer 10 on the basis of the detection of the rapid-pace use of the consumable item.

When the process of S507 is performed on the basis of the acquisition of the notification of the order request, the CPU stores in the storage 102 manual order completion information indicating that the process of S507 is performed. When the acquired notification is determined to be any other notification (S503: other), the CPU performs the process in S501. Any other notification is transmitted to the CPU when the No button 20c of the warning screen 20 is manipulated or when an instruction not to make an order is inputted to the confirmation screen.

When the CPU determines that the manual order has been made in S506 (S506: Yes), the CPU transmits an instruction (hereinafter, referred to as a "confirmation screen display instruction") to display the confirmation screen to the display 19 (S608). After performing the process of S608, the CPU subsequently performs the process in S501. The confirmation screen (not illustrated) displayed on the display 19 of the printer 10 when the remaining amount of the consumable item reaches the automatic order threshold value after the manual order is placed. After the CPU initially transmits the confirmation screen display instruction in S508, when the corresponding consumable item is replaced, the CPU transmits an instruction to erase the confirmation screen to the display 19. Alternatively, the display 19 that has received the confirmation screen display instruction displays the confirmation screen and then erases the confirmation screen after a predetermined period of time (for example, after 6 hours).

When the manual order is performed on the basis of the rapid-pace use of the consumable item, even if the automatic order condition is met later, an order is likely to be unnecessary because the consumable item is redundantly ordered. In this regard, according to the process of S505, S506, and S608, when the automatic order condition is met after the manual order is placed, the confirmation screen is displayed on the display 19 without placing an order (that is, without transmitting the order information). Therefore, an unnecessary consumable item can be prevented from being delivered uselessly. On the other hand, even when the manual order is not placed although the consumable item is used in rapid pace, if the automatic order condition is met later, the order information is transmitted to the shipping server 200 in S507.

In the consumable item order process, the values included in the consumable item information acquired by the CPU of the controller 11 are stored in a table 102a (see FIG. 6) installed in the ROM or the RAM of the controller 11. In the table 102a, type information 102a2, a remaining amount 102a3, the number of replacements 102a4, a print count 102a5, and manual order completion information 102a6 are associated with unique information 102a1.

When the CPU of the controller 11 acquires the consumable item information, in S504, the values included in the acquired consumable item information are stored in the table 102a. Specifically, for the unique information 102a1 identifying the printer 10 that is the transmission source of the consumable item information, the values of the remaining amount information, the number of replacements, and the print count included in the consumable item information are stored in the remaining amount 102a3, the number of replacements 102a4, and the print count 102a5, respectively, for each type of the consumable item indicated by the type information 102a2 included in the consumable item information.

In the printer 10 according to the fourth embodiment, when the rapid-pace use of the consumable item is detected on the basis of the change with time in the remaining amount of the consumable item indicated by the remaining amount information received from the detection sensor 15, the user can manually order a new consumable item through the warning screen 20 displayed on the display 19 of the printer 10. Thus, even when the remaining amount of the consumable item does not reach the automatic order threshold value, the printer 10 can transmit the order information to the shipping server 200 on the basis of the manual order placed by the user. Therefore, the order of the new consumable item can be placed in adequate time despite the rapid-pace usage of the consumable item. Consequently, an occurrence of a problematic situation in which the user cannot use the printer 10 owing to the completely consumed consumable item can be avoided.

Particularly, when the rapid-pace use of the consumable item is detected, the printer 10 transmits the order information in response to receipt of the manual order placed by the user. Thus, in a situation in which the detected rapid-pace use is temporary and it is unnecessary to place an order in view of the remaining amount of the consumable item, the consumable item can be prevented from being inappropriately ordered.

Figure 12:
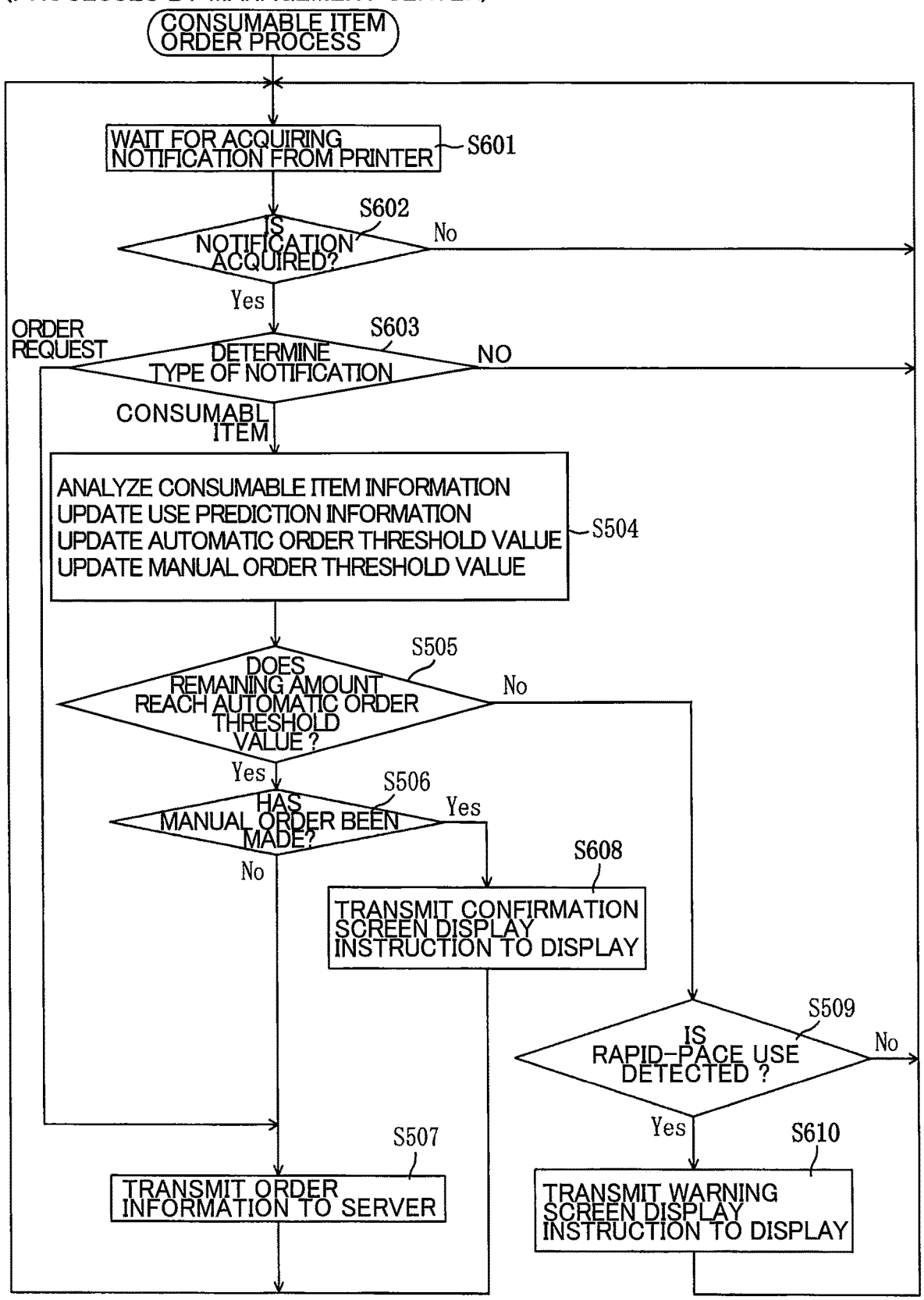
FIG. 12 is a flowchart illustrating a consumable item order process performed by a controller of the printer according to the fourth embodiment.

In the above embodiments, the processes described in FIGS. 5, 6, and 12 are performed by the CPU of the controllers 101, 301, or 11, but the processes described in the respective drawings may be performed by collaboration of a plurality of CPUs. Also, the processes described in the respective drawings may be performed by single IC or collaboration of a plurality of ICs such as ASICs. Furthermore, the processes described in the respective drawings may be performed by collaboration of the CPU and the IC such as the ASIC.

What is claimed is:
1. An information processing apparatus comprising:
a network interface configured to communicate with a server;
a storage; and
control circuitry configured to:
    acquire, from a sensor of an image forming apparatus, remaining amount information about a remaining amount of ink or toner in a printer cartridge currently in use by the image forming apparatus, the image forming apparatus being included as part of either the information processing apparatus or a device external to the information processing apparatus;
    determine whether or not an order condition for ordering a new printer cartridge is met on the basis of the remaining amount information, the order condition including the remaining amount of ink or toner being at or below a threshold ink or toner level;
    in a case where the order condition has not been met:
        determine a rate of consumption of the ink or toner in the printer cartridge currently in use on the basis of the remaining amount information;
        in response to determining that the rate of consumption of the ink or toner in the printer cartridge currently in use is above a threshold rate of consumption, provide a user notification indicating that the rate of consumption is higher than the threshold rate of consumption, wherein the order condition is different from the rate of consumption being above the threshold rate of consumption, wherein the user notification further includes an option to place an order for the new printer cartridge;

after providing the user notification, receive a user instruction to place an order for the new printer cartridge; and in response to receipt of the user instruction to place the order of the new printer cartridge, transmit order information including information about the order of the new printer cartridge to the server; and in response to determining that the order condition is met before receiving the user instruction to place the order of the new printer cartridge, transmit the order information to the server.

2. The information processing apparatus according to claim 1, wherein the control circuitry is further configured to:

acquire the remaining amount information at a predetermined time interval;

calculate a first consumption inclining of the ink or toner in the printer cartridge currently in use on the basis of a plurality of pieces of the remaining amount information acquired during a first period of time, the first period of time spanning from a first timing when the printer cartridge currently in use replaces a printer cartridge immediately previously used to a second timing when the latest remaining amount information is acquired;

determine a first threshold value on the basis of the first consumption inclining;

when the remaining amount represented by the remaining amount information reaches the first threshold value, determine that the order condition is met;

calculate a second consumption inclining of the ink or toner in the printer cartridge currently in use on the basis of a plurality of pieces of the remaining amount information acquired during a second period of time, the second period of time spanning from a third timing traced back from the second timing by a predetermined period of time shorter than the first period of time to the second timing; and perform the determination of whether or not the rate of consumption of the ink or toner in the printer cartridge currently in use is higher than the threshold rate of consumption on the basis of the second consumption inclining.

3. The information processing apparatus according to claim 2, wherein the second consumption inclining is represented by a primary regression straight line expressing a variation with time in the remaining amount of ink or toner of the printer cartridge currently in use during the second period of time, and wherein the control circuitry is further configured to determine that the printer cartridge currently in use has been used in rapid pace when an absolute value of a gradient of the primary regression straight line exceeds a specific value.

4. The information processing apparatus according to claim 3, wherein the specific value is determined by the control circuitry on the basis of:

the remaining amount of ink or toner in the printer cartridge represented by the most recently acquired remaining amount information;

the second timing; and a number of required delivery days required for completion of delivery of the new printer cartridge.

5. The information processing apparatus according to claim 3, wherein the specific value is determined by the control circuitry on the basis of:

the remaining amount of ink or toner in the printer cartridge represented by the most recently acquired remaining amount information;

the second timing;

number of required delivery days required for completion of delivery of the new printer cartridge; and the predetermined time interval.

6. The information processing apparatus according to claim 2, wherein the control circuitry is further configured to acquire the remaining amount information at a time interval shorter than the predetermined time interval after the remaining amount represented by the remaining amount information has reached a second threshold value larger than the first threshold value.

7. The information processing apparatus according to claim 2, wherein the control circuitry is further configured to:

determine whether a difference value between the first threshold value and the remaining amount represented by the remaining amount information is equal to or smaller than a specific value; and in response to determining that the difference value is equal to or smaller than the specific value, perform the determination of whether or not the printer cartridge currently in use has been used in rapid pace.

8. The information processing apparatus according to claim 1, wherein the control circuitry is further configured to:

after receiving a user instruction not to place the order of the new printer cartridge: in response to determining that the order condition is met transmit the order information; and in response to determining that the order condition is met after the user instruction to place the order of the new printer cartridge is received, notify a user, that the order of the new printer cartridge has been placed.

9. The information processing apparatus according to claim 1, wherein the image forming apparatus is a printer, and wherein the remaining amount information includes unique information, the unique information being for specifying the printer in which the printer cartridge is used.

10. The information processing apparatus according to claim 1, wherein the order information includes unique information and type information, the unique information being for specifying a printer corresponding to the image forming apparatus from which the remaining amount information is acquired, and wherein the information processing apparatus further acquires printer cartridge type information including a type of the printer cartridge to be ordered.

11. The information processing apparatus according to claim 1, wherein the control circuitry is further configured to acquire the remaining amount information at a predetermined time interval.

12. A printer comprising the information processing apparatus according to claim 1, wherein the image forming apparatus is part of the printer.

13. A management server comprising the information processing apparatus according to claim 1.

14. A personal computer comprising the information processing apparatus according to claim 1, wherein the image forming apparatus is external to the personal computer.

15. The information processing apparatus according to claim 1, wherein the image forming apparatus is a printer,
wherein the remaining amount information includes unique information for specifying the printer, and
wherein the remaining amount is used for the printer specified by the unique information.

16. The information processing apparatus according to claim 15, wherein the unique information is stored in the storage.

17. The information processing apparatus according to claim 1, wherein the control circuitry is further configured to:
acquire the remaining amount information at a predetermined time interval,
calculate a consumption inclining of the ink or toner in the printer cartridge currently in use on the basis of a plurality of pieces of the remaining amount information acquired during a period of time, the period of time spanning from a first timing when the printer cartridge currently in use replaces a printer cartridge previously used to a second timing when the latest remaining amount information is acquired,
determine a threshold value on the basis of the consumption inclining,
when the remaining amount represented by the remaining amount information reaches the threshold value, determine that the order condition is met, and
determine whether or not the rate of consumption of the ink or toner in the printer cartridge currently in use is higher than the threshold rate of consumption on the basis of a difference value between a first remaining amount and a second remaining amount, the first remaining amount being represented by the currently acquired remaining amount information, the second remaining amount being represented by the immediately previously acquired remaining amount information.

18. The information processing apparatus according to claim 17, wherein the control circuitry is further configured to determine that the rate of consumption of the ink or toner in the printer cartridge currently in use is higher than the threshold rate of consumption when the difference value exceeds a specific value.

19. An information processing apparatus comprising:
a storage; and
control circuitry configured to:
acquire, from a sensor of an image forming apparatus, remaining amount information about a remaining amount of toner or ink in the printer cartridge currently in use by the image forming apparatus, the image forming apparatus being included as part of either the information processing apparatus or a device external to the information processing apparatus;
determine whether or not an order condition for ordering a new printer cartridge is met on the basis of the remaining amount information, the order condition including the remaining amount of ink or toner being at or below a threshold ink or toner level;
in a case where the order condition has not been met:
determine a rate of consumption of the ink or toner in the printer cartridge currently in use on the basis of the remaining amount information;
in response to determining that the rate of consumption of the ink or toner in the printer cartridge currently in use is above a threshold rate of consumption, provide a user notification indicating that the rate of consumption is higher than the threshold rate of consumption, wherein the order condition is different from the rate of consumption being above the threshold rate of consumption, wherein the user notification further includes an option to place an order for the new printer cartridge;
after providing the user notification, receive a user instruction to place an order for the new printer cartridge; and
in response to receipt of the user instruction to place the order of the new printer cartridge, determine to order the new printer cartridge; and
in response to determining that the order condition is met before receiving the user instruction to place the order of the new printer cartridge, transmit order information to a server.

* * * * *

UNITED STATES PATENT AND TRADEMARK OFFICE
CERTIFICATE OF CORRECTION

PATENT NO. : 10,803,510 B2
APPLICATION NO. : 15/085471
DATED : October 13, 2020
INVENTOR(S) : Takeshi Nagasaki It is certified that error appears in the above-identified patent and that said Letters Patent is hereby corrected as shown below:

In the Claims

Column 24, Claim 8, Line 36:
Please delete "met transmit" and insert --met, transmit--

Column 24, Claim 8, Line 40:
Please delete "a user, that" and insert --a user that--

Signed and Sealed this
Nineteenth Day of April, 2022

Katherine Kelly Vidal
*Director of the United States Patent and Trademark Office*